US012078410B2

(12) United States Patent
Harikrishnasamy

(10) Patent No.: US 12,078,410 B2
(45) **Date of Patent: *Sep. 3, 2024**

(54) WALLED STRUCTURE FOR AN APPLIANCE WITH WIDE SEALABLE APERTURE FOR DEPOSITING INSULATION MATERIAL WITHIN THE WALLED STRUCTURE

(71) Applicant: WHIRLPOOL CORPORATION, Benton Harbor, MI (US)

(72) Inventor: Arunkumar Harikrishnasamy, Stevensville, MI (US)

(73) Assignee: Whirlpool Corporation, Benton Harbor, MI (US)

(*) Notice: Subject to any disclaimer, the term of this patent is extended or adjusted under 35 U.S.C. 154(b) by 308 days.

This patent is subject to a terminal disclaimer.

(21) Appl. No.: 17/520,504

(22) Filed: Nov. 5, 2021

(65) Prior Publication Data

US 2022/0090851 A1 Mar. 24, 2022

Related U.S. Application Data

(62) Division of application No. 17/025,403, filed on Sep. 18, 2020, now Pat. No. 11,236,939.

(51) Int. Cl.
*F25D 23/06* (2006.01)

(52) U.S. Cl.
CPC ......... *F25D 23/066* (2013.01); *F25D 23/062* (2013.01); *F25D 2201/122* (2013.01); *F25D 2201/14* (2013.01)

(58) Field of Classification Search
None
See application file for complete search history.

(56) References Cited

U.S. PATENT DOCUMENTS 2,318,744 A 5/1943 Brown
2,439,603 A 4/1948 Heritage
4,272,935 A 6/1981 Lukas et al.
5,509,248 A 4/1996 Dellby et al.
(Continued)

FOREIGN PATENT DOCUMENTS

EP 3492849 A1 6/2019
GB 2140143 A 11/1984
(Continued)

*Primary Examiner* — Jacob T Minskey
*Assistant Examiner* — Adrianna N Konves
(74) *Attorney, Agent, or Firm* — Price Heneveld LLP

(57) ABSTRACT

A walled structure for an appliance comprising: (i) an inner wall portion defining a reception compartment, the reception compartment having a width; (ii) an outer wall portion facing the inner wall portion and at least partially surrounding the inner wall portion, the outer wall portion separated from the inner wall portion by a space, the outer wall portion being disposed further away from the reception compartment than the inner wall portion, the outer wall portion having a width parallel to the width of the reception compartment; (iii) an interior volume including the space between the inner wall portion and the outer wall portion; and (iv) an aperture through the outer wall portion providing access to the interior volume, the aperture having a width parallel to the widths of the reception compartment and the outer wall portion that is at least 25 percent of the width of the outer wall portion.

20 Claims, 17 Drawing Sheets

10
12
14
24
30
26
16
18
22
118
116
112

(56) References Cited

U.S. PATENT DOCUMENTS

| | | | |
|---|---|---|---|
| 9,791,205 | B2 | 10/2017 | Mukherjee et al. |
| 10,041,724 | B2 | 8/2018 | Allo et al. |
| 10,422,573 | B2 | 9/2019 | Deka et al. |
| 10,667,517 | B2 | 6/2020 | Fischer et al. |
| 2013/0257257 | A1 | 10/2013 | Cur et al. |
| 2014/0015395 | A1 | 1/2014 | Anthony et al. |
| 2014/0346942 | A1 | 11/2014 | Kim et al. |
| 2017/0159996 | A1 | 6/2017 | Deka et al. |
| 2017/0159999 | A1 | 6/2017 | Deka et al. |
| 2017/0167782 | A1 | 6/2017 | Diptesh et al. |
| 2017/0176093 | A1* | 6/2017 | Kang .................... F25D 23/066 |
| 2019/0145697 | A1 | 5/2019 | Naik et al. |
| 2019/0162465 | A1 | 5/2019 | Allard et al. |
| 2020/0103067 | A1 | 4/2020 | Allard et al. |
| 2021/0108852 | A1 | 4/2021 | Guizoni, Jr. et al. |

FOREIGN PATENT DOCUMENTS

| | | | |
|---|---|---|---|
| JP | S5298266 | U | 7/1977 |
| JP | 2007309564 | A | 11/2007 |
| WO | 2016195150 | A1 | 12/2016 |
| WO | 2019070284 | A1 | 4/2019 |
| WO | 2019083535 | A1 | 5/2019 |
| WO | 2020050838 | A1 | 3/2020 |

* cited by examiner 24
36
70
102
134
12
14
68

WALLED STRUCTURE FOR AN APPLIANCE WITH WIDE SEALABLE APERTURE FOR DEPOSITING INSULATION MATERIAL WITHIN THE WALLED STRUCTURE

CROSS-REFERENCE TO RELATED APPLICATION

This application is a divisional of and claims priority to U.S. patent application Ser. No. 17/025,403, filed 18 Sep. 2020, entitled WALLED STRUCTURE FOR AN APPLIANCE WITH WIDE SEALABLE APERTURE FOR DEPOSITING INSULATION MATERIAL WITHIN THE WALLED STRUCTURE, now U.S. Patent No. 11,236,939, issued Feb. 1 2022, the disclosure of which is hereby incorporated herein by reference in its entirety.

BACKGROUND OF THE DISCLOSURE

The present disclosure generally relates to a walled structure for an appliance with an interior volume to hold insulating material, and more specifically, to such a walled structure including an aperture to facilitate filling of the interior volume with the insulating material before being sealed.

Appliances sometimes include an insulated structure to reduce heat transfer between the appliance and an external environment. The insulated structure can improve the efficiency of the appliance. Sometimes, the insulated structure is a walled structure with an interior volume where insulation material is disposed. Heretofore, the walled structure has included relatively small and spaced holes through which insulation material is deposited into the interior volume. With the assistance of the force of gravity, the insulation material migrates within the interior volume and fills some of the interior volume.

However, there are problems in that (i) the insulation material does not fill the entirety of the interior volume, leaving voids within the walled structure without insulation material and (ii) the small and spaced holes regularly clog and thereby resist flow of insulation material into the structure, which results in variability in the amount of insulation material in the structure from unit to unit. Complex geometry of the insulated structure exacerbates problem (i). Voids in the structure without insulation material increases heat transfer from the appliance to the external environment, which decreases the efficiency of the appliance. Variability in the amount of insulation material from unit to unit may reduce the ability of some appliances to perform to design specifications.

SUMMARY OF THE DISCLOSURE

The present disclosure addresses those problems with an aperture through an outer wall portion of the walled structure, the aperture having a dimension (e.g., width) that is at least 25 percent of a parallel dimension of the outer wall portion. The aperture having such a dimension provides space for a discharge end of a pumping apparatus to be placed through the aperture and near terminal regions of the interior volume, and the insulation material can be pumped and discharged out the discharge end into those terminal regions. The dimension of the aperture additionally allows the discharge end to be moved from side to side to release clumping and achieve even and full distribution of the insulation material within the interior volume.

In addition, the present disclosure addresses those problems by disposing the aperture adjacent a junction of a change in geometry of the interior volume. For example, assuming that the interior volume has a rear portion that extends generally along the rear of the appliance and a top portion that extends generally along the top of the appliance, the aperture can be placed through the outer wall portion adjacent to where the top portion and the rear portion of the interior volume join. Such placement of the aperture allows a straight line access for the discharge end of the pumping apparatus to be placed into the top portion of the interior volume, and also a second straight access for the discharge end to be placed in the rear portion of the interior volume. These approaches to solve the problems mentioned above allow for the insulating material to be placed within nearly 100 percent of the interior volume before the aperture is sealed and without clogging. This result is a marked improvement over what had previously been done.

According to one aspect of the present disclosure, a liner for an appliance comprises: a walled structure comprising: (i) an inner wall portion that is shaped to define a reception compartment, the inner wall portion comprising a first section and a second section opposing the first section, the first section and the second section defining a dimension of the reception compartment; (ii) an outer wall portion facing the inner wall portion and at least partially surrounds the inner wall portion, the outer wall portion separated from the inner wall portion by a space, the outer wall portion being disposed further away from the reception compartment than the inner wall portion, the outer wall portion having a dimension parallel to the dimension of the reception compartment; (iii) an interior volume including the space between the inner wall portion and the outer wall portion; and (iv) an aperture through the walled structure providing access to the interior volume, the aperture having a dimension parallel to the dimension of the reception compartment and the dimension of the outer wall portion, the dimension of the aperture being at least 25 percent of the dimension of the outer wall portion. The dimension of the aperture can be at least 55 percent of the dimension of the outer wall portion.

The liner can further comprise insulation material disposed within the interior volume of the walled structure. The liner can further comprise a seal that seals the aperture of the walled structure in an air-tight manner. The walled structure can form an air-tight seal around the interior volume except for the aperture. The walled structure can comprise sheet metal. The interior volume of the walled structure has an air pressure. An external environment surrounding the liner has an air pressure that can be greater than the air pressure of the interior volume of the walled structure.

The first section and the second section of the inner wall portion can be lateral walls of the reception compartment. The dimension of the reception compartment defined by the first section and the second section of the inner wall portion can be a width of the reception compartment.

The inner wall portion can further comprise a third section and a fourth section opposing the third side. The third section can be a ceiling of the reception compartment, and the fourth side can be a floor of the reception compartment. The inner wall portion can further comprise a fifth section rearward of an opening into the reception compartment. The fifth section can be a rear wall of the reception compartment.

The inner wall portion can include an outer surface that faces the interior volume of the walled structure, with the outer surface forming a reflex angle. The outer wall portion can include an inner surface that faces the interior volume of the walled structure. The inner surface can form an angle between 75 degrees and 105 degrees. The inner surface can face a first portion of the interior volume before forming the angle and a second portion of the interior volume after forming the angle. The aperture can provide (i) a first straight-line access from an external environment to the first portion of the interior volume and (ii) a second straight-line access from the external environment to the second portion of the interior volume.

The inner wall portion can form a ceiling and a rear wall of the reception compartment. The first portion of the interior volume can be above a ceiling of the reception compartment. The second portion of the interior volume can be behind the rear wall of the reception compartment.

The inner wall portion can be further shaped to define a second reception compartment disposed below the reception compartment. The walled structure can provide a second opening into the second reception compartment. The interior volume can comprise (i) a rear portion that is rearward of both the reception compartment and the second reception compartment, (ii) a top portion that extends above the reception compartment, (iii) a bottom portion that extends below the second reception compartment, and (iv) a middle portion that extends between the reception compartment and the second reception compartment. The interior volume can be contiguous throughout the rear portion, the top portion, the bottom portion, and the middle portion. The interior volume can further comprise (i) a first side portion that is lateral to the reception compartment and the second reception compartment, and (ii) a second side portion that is lateral to the reception compartment and the second reception compartment but opposing the first side portion.

According to another aspect of the present disclosure, an appliance comprises: (a) a liner comprising: (i) a walled structure comprising: an inner wall portion that is shaped to define a reception compartment, the inner wall portion comprising a first section and a second section opposing the first section, the first section and the second section defining a dimension of the reception compartment; an outer wall portion facing the inner wall portion and at least partially surrounds the inner wall portion, the outer wall portion separated from the inner wall portion by a space, the outer wall portion being disposed further away from the reception compartment than the inner wall portion, the outer wall portion having a dimension parallel to the dimension of the reception compartment; an interior volume including the space between the inner wall portion and the outer wall portion; and an aperture through the walled structure providing access to the interior volume, the aperture having a dimension parallel to the dimension of the reception compartment and the dimension of the outer wall portion, the dimension of the aperture being at least 25 percent of the dimension of the outer wall portion; (ii) insulation material disposed within the interior volume of the walled structure; and (iii) a seal that seals the aperture of the walled structure in an air-tight manner; and (b) a door having (i) a closed position cooperating with the walled structure to deny access to the reception compartment and (ii) an open position allowing access to the reception compartment through an opening of the walled structure.

The interior volume of the walled structure has an air pressure. An external environment surrounding the liner can have an air pressure greater than the air pressure of the interior volume of the walled structure.

The inner wall portion can include an outer surface that faces the interior volume of the walled structure. The outer surface can form a reflex angle. The outer wall portion can include an inner surface that faces the interior volume of the walled structure. The inner surface can form an angle between 75 degrees and 105 degrees. The inner surface can face a first portion of the interior volume before forming the angle and a second portion of the interior volume after forming the angle. The aperture provides (i) a first straight-line access from an external environment to the first portion of the interior volume and (ii) a second straight-line access from the external environment to the second portion of the interior volume.

The inner wall portion can be further shaped to define a second reception compartment disposed below the reception compartment. The walled structure can provide a second opening into the second reception compartment. The interior volume can comprise (i) a rear portion that is rearward of both the reception compartment and the second reception compartment, (ii) a top portion that extends above the reception compartment, (iii) a bottom portion that extends below the second reception compartment, and (iv) a middle portion that extends between the reception compartment and the second reception compartment. The interior volume can be contiguous throughout the rear portion, the top portion, the bottom portion, and the middle portion.

According to yet another aspect of the present disclosure, a method of manufacturing a liner for an appliance comprises: (a) inserting a discharge end of a pumping apparatus into an interior volume of a walled structure through an aperture of the walled structure; (b) depositing insulating material into the interior volume of the walled structure through the discharge end of the pumping apparatus; (c) removing the pumping apparatus from the interior volume of the walled structure; and (d) sealing the aperture of the walled structure.

The walled structure can further comprise: (i) an inner wall portion that is shaped to define a reception compartment, the inner wall portion comprising a first section and a second section opposing the first section, the first section and the second section defining a dimension of the reception compartment; (ii) an outer wall portion facing the inner wall portion and at least partially surrounds the inner wall portion, the outer wall portion separated from the inner wall portion by a space, the outer wall portion being disposed further away from the reception compartment than the inner wall portion, the outer wall portion having a dimension parallel to the dimension of the reception compartment; (iii) an interior volume including the space between the inner wall portion and the outer wall portion; and (iv) an aperture through the walled structure providing access to the interior volume, the aperture having a dimension parallel to the dimension of the reception compartment and the dimension of the outer wall portion, the dimension of the aperture being at least 25 percent of the dimension of the outer wall portion.

The inner wall portion can be further shaped to define a second reception compartment disposed below the reception compartment. The walled structure can provide a second opening into the second reception compartment. The interior volume can comprise (i) a rear portion that is rearward of both the reception compartment and the second reception compartment, (ii) a top portion that extends above the reception compartment, and (iii) a bottom portion that extends below the second reception compartment. The interior volume can be contiguous throughout the rear portion, the top portion, and the bottom portion. The aperture can be disposed adjacent to the rear portion and the top portion of the interior volume. The aperture can provide (i) a first straight-line access from an external environment to the rear portion of the interior volume and (ii) a second straight-line access from the external environment to the top portion of the interior volume. The method can further comprise, before removing the pumping apparatus from the interior volume, situating the walled structure so that (i) the top portion of the interior volume is at an acute angle θ from vertical and (ii) the aperture through the walled structure into the interior volume is disposed higher than the bottom portion of the interior volume.

These and other features, advantages, and objects of the present disclosure will be further understood and appreciated by those skilled in the art by reference to the following specification, claims, and appended drawings.

The components in the figures are not necessarily to scale, emphasis instead being placed upon illustrating the principles described herein.

DETAILED DESCRIPTION

Figure 1:
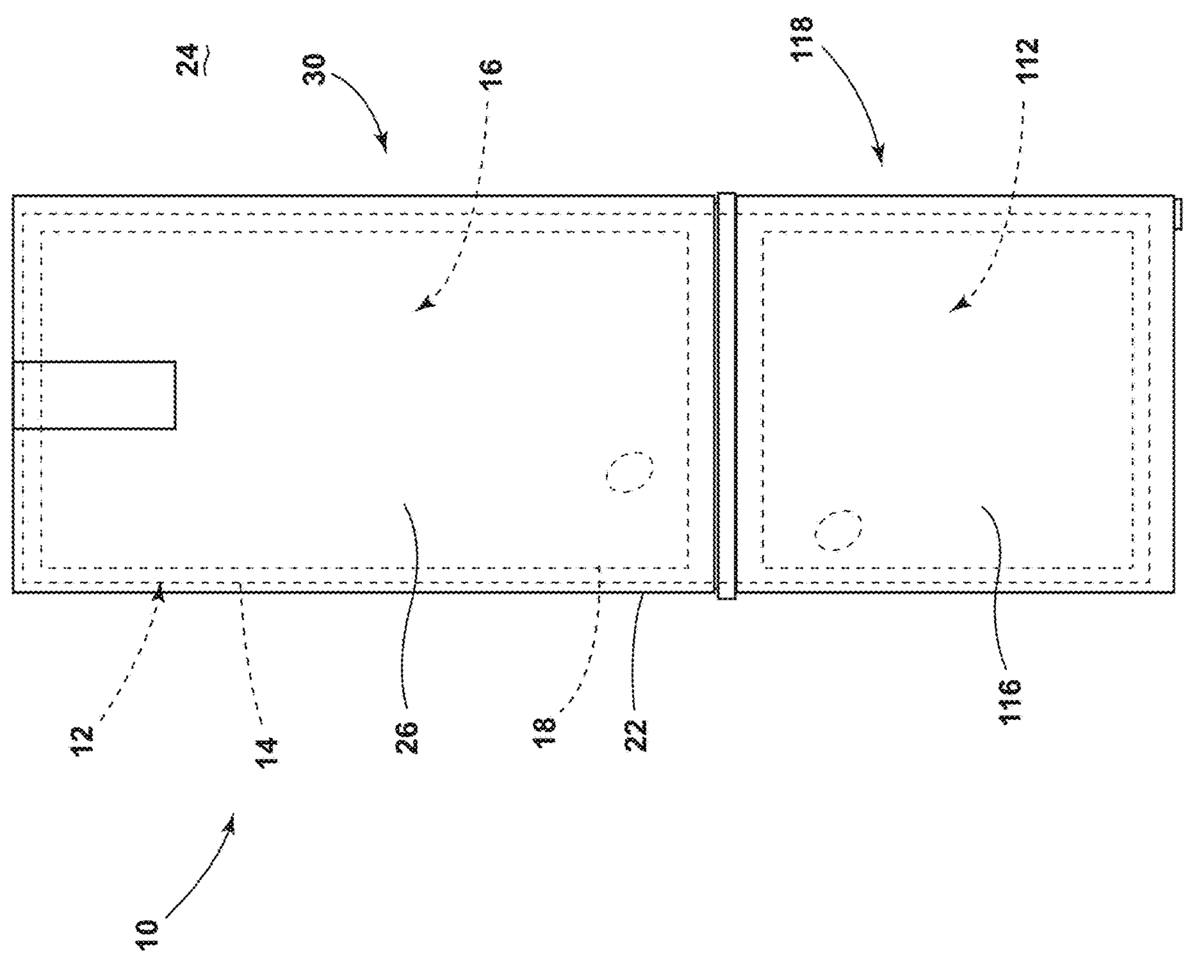
FIG. 1 is a front view of an appliance of the present disclosure, illustrating a walled structure with an interior volume covered by a cabinet and doors in a closed position.

For purposes of description herein, the terms "rearward," "rear," "lateral," "behind," "above," "top," "bottom," "forward," and "side" shall relate to the disclosure as oriented in FIG. 1. It is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims.

Figure 2:
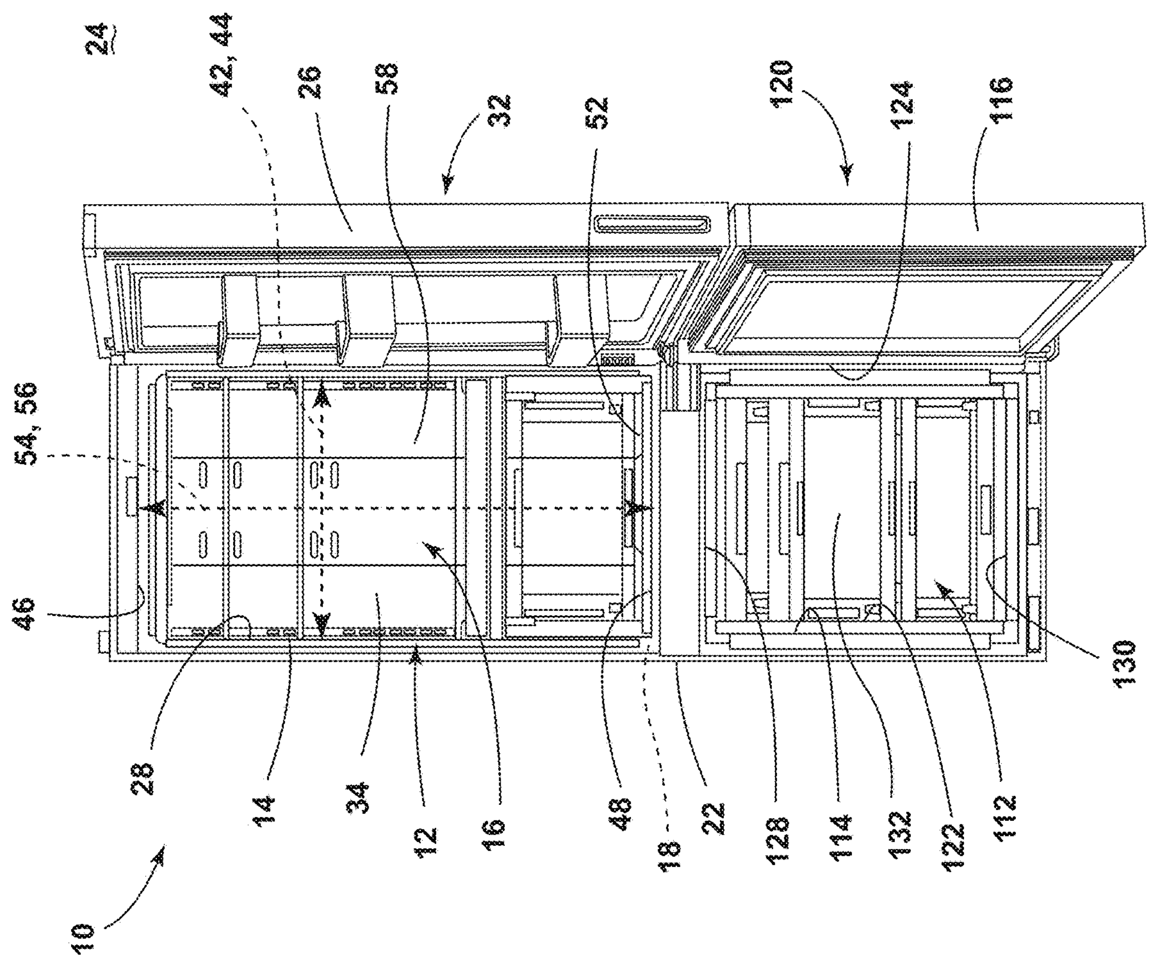
FIG. 2 is a front view of the appliance of FIG. 1, illustrating the doors in an open position revealing the walled structure being shaped to provide a reception compartment (such as for fresh food) and a second reception compartment (such as for frozen food)
Figure 3:
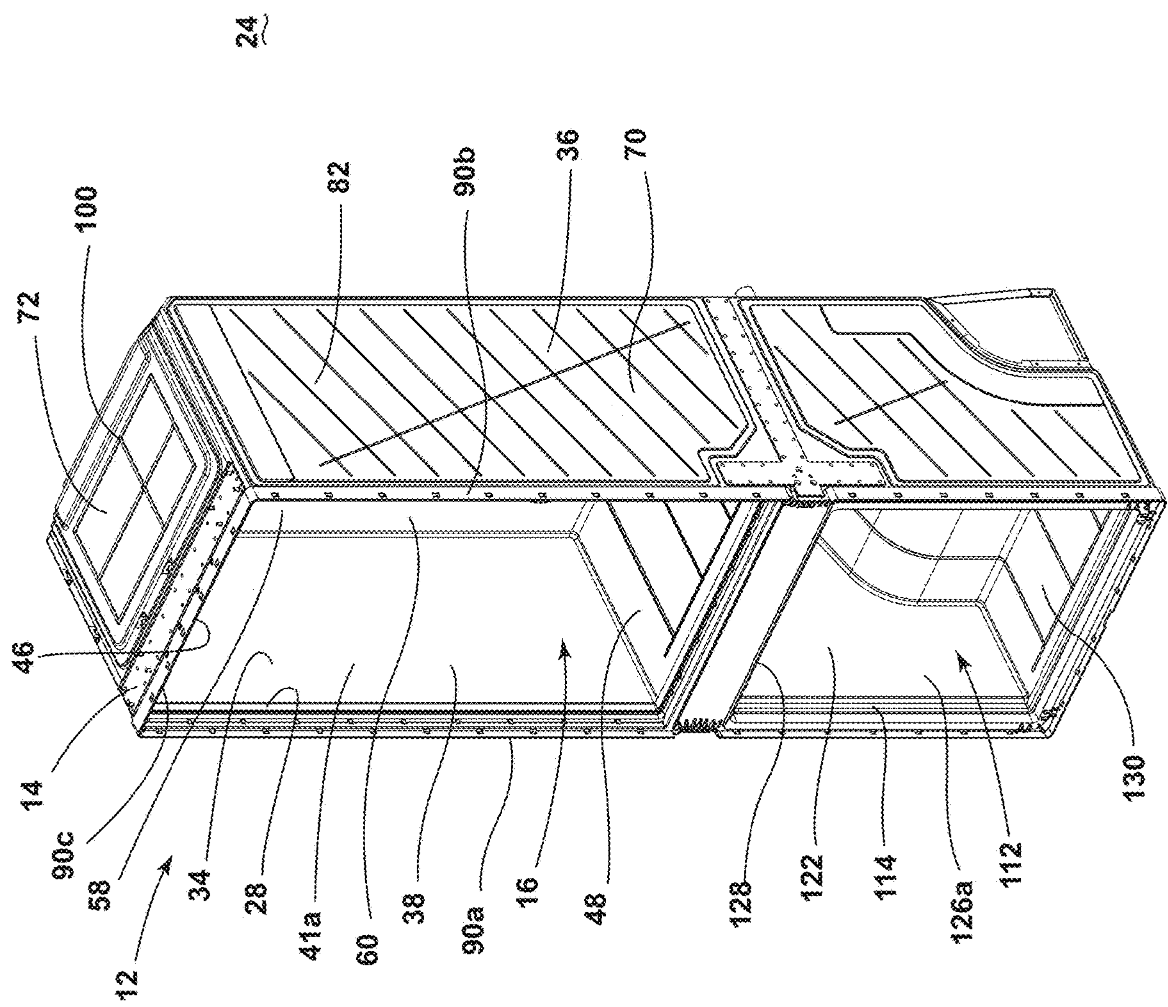
FIG. 3 is a perspective view of the walled structure of FIG. 1, illustrating an inner wall portion having various sections that define the reception compartment and the second reception compartment, and an outer wall portion closer to an external environment than the inner wall portion.
Figure 4:
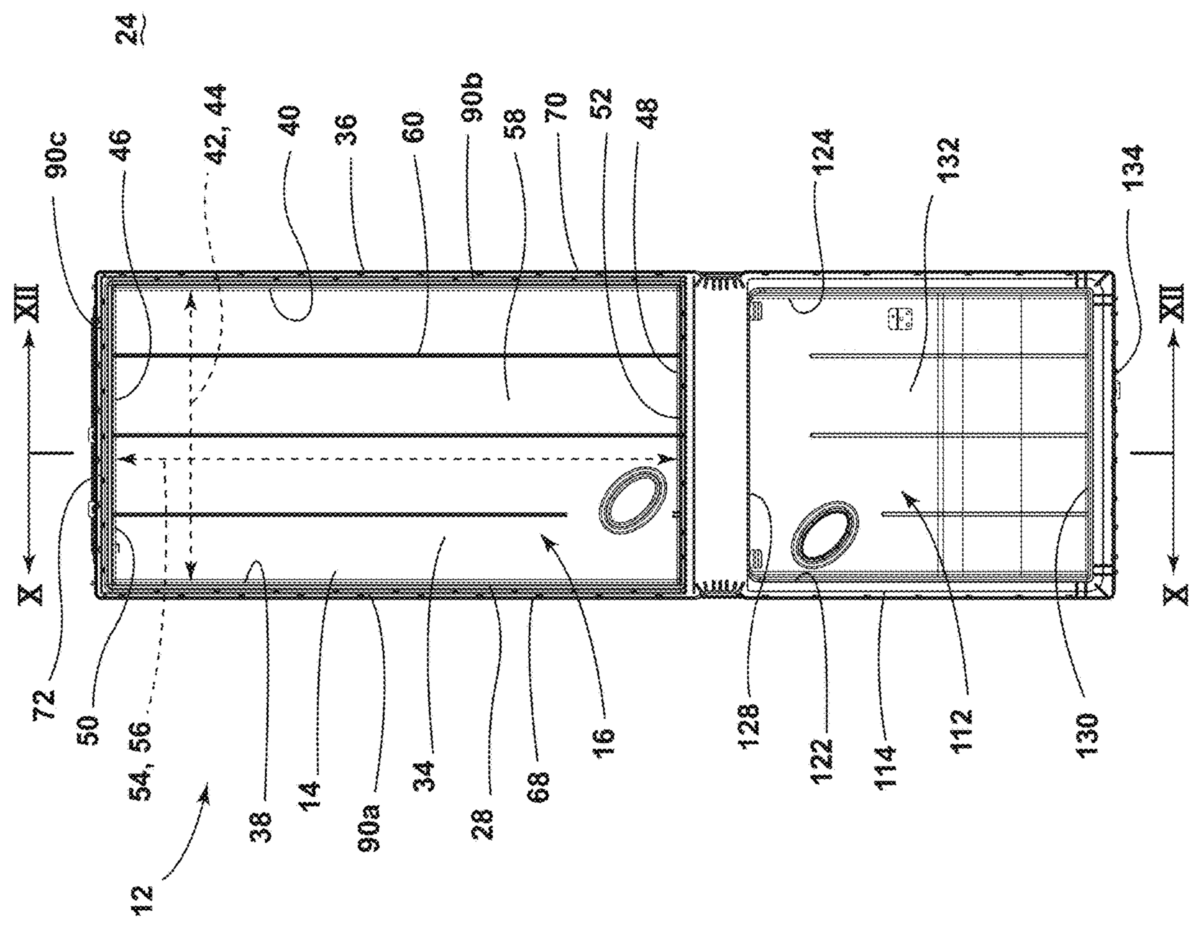
FIG. 4 is a front view of the walled structure of FIG. 1, illustrating the inner wall portion defining a dimension (e.g., a width) of the reception compartment.
Figure 5:
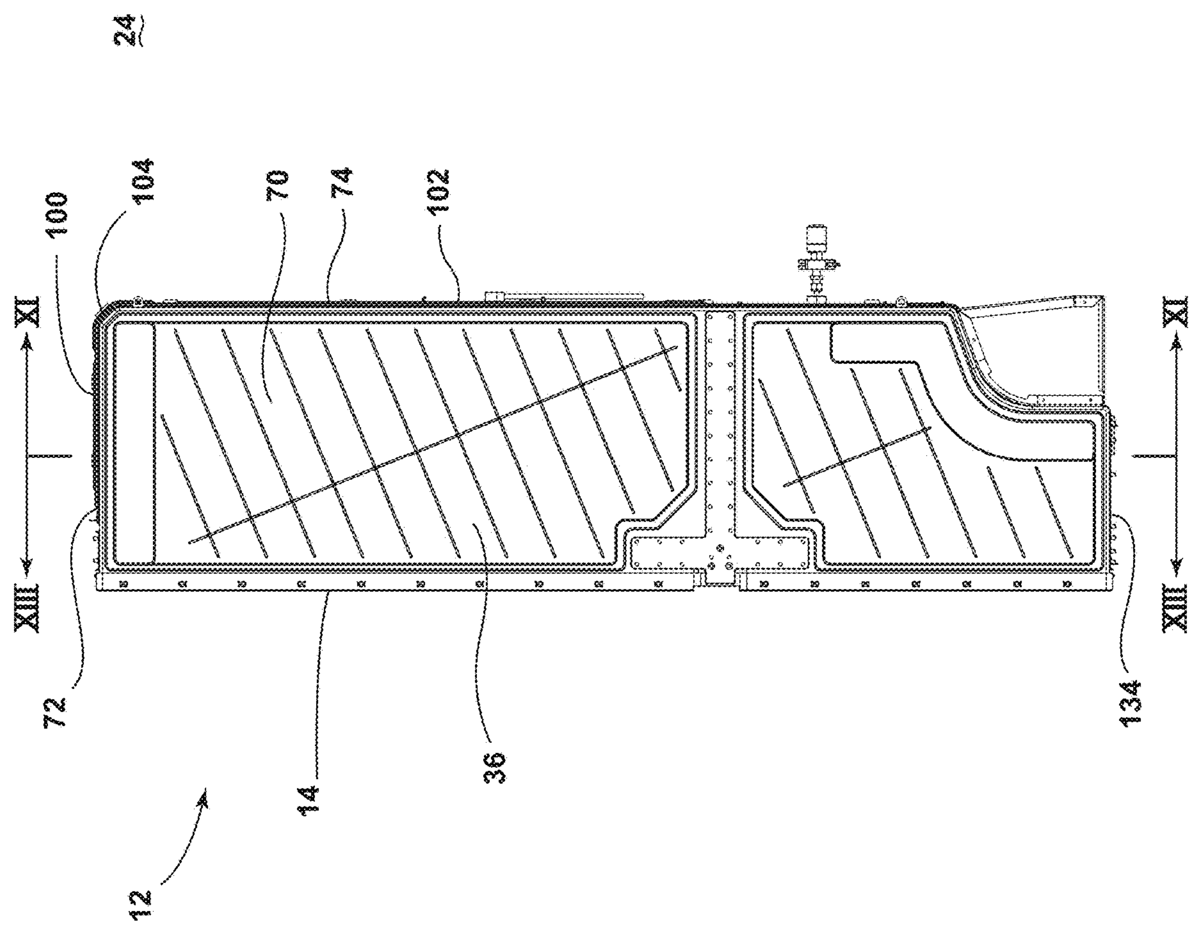
FIG. 5 is a side view of the walled structure of FIG. 1.
Figure 6:
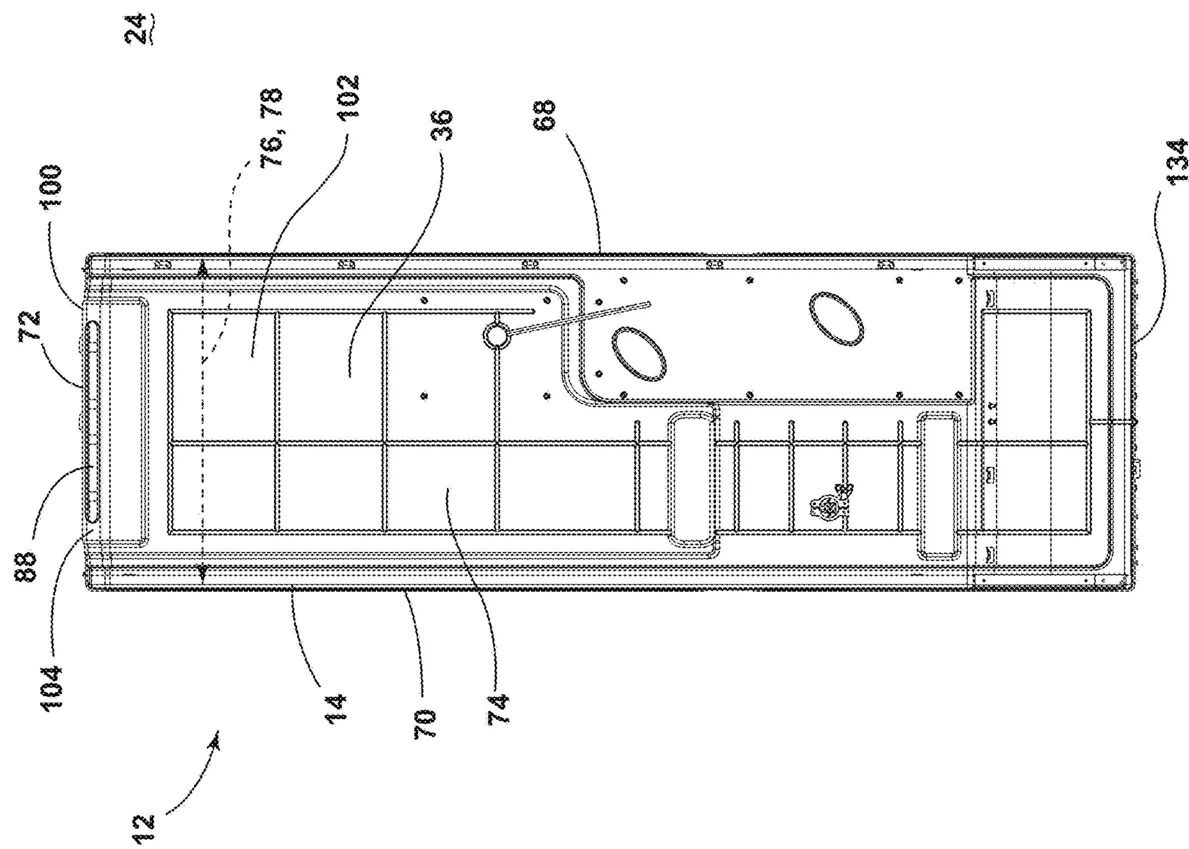
FIG. 6 is a rear view of the walled structure of FIG. 1, illustrating the outer wall portion having a section with a dimension (e.g., a width) that is parallel to the dimension of the reception compartment defined by the inner wall portion, and an aperture into the interior volume disposed at an angled transition of a rear and a top of the walled structure.
Figure 7:
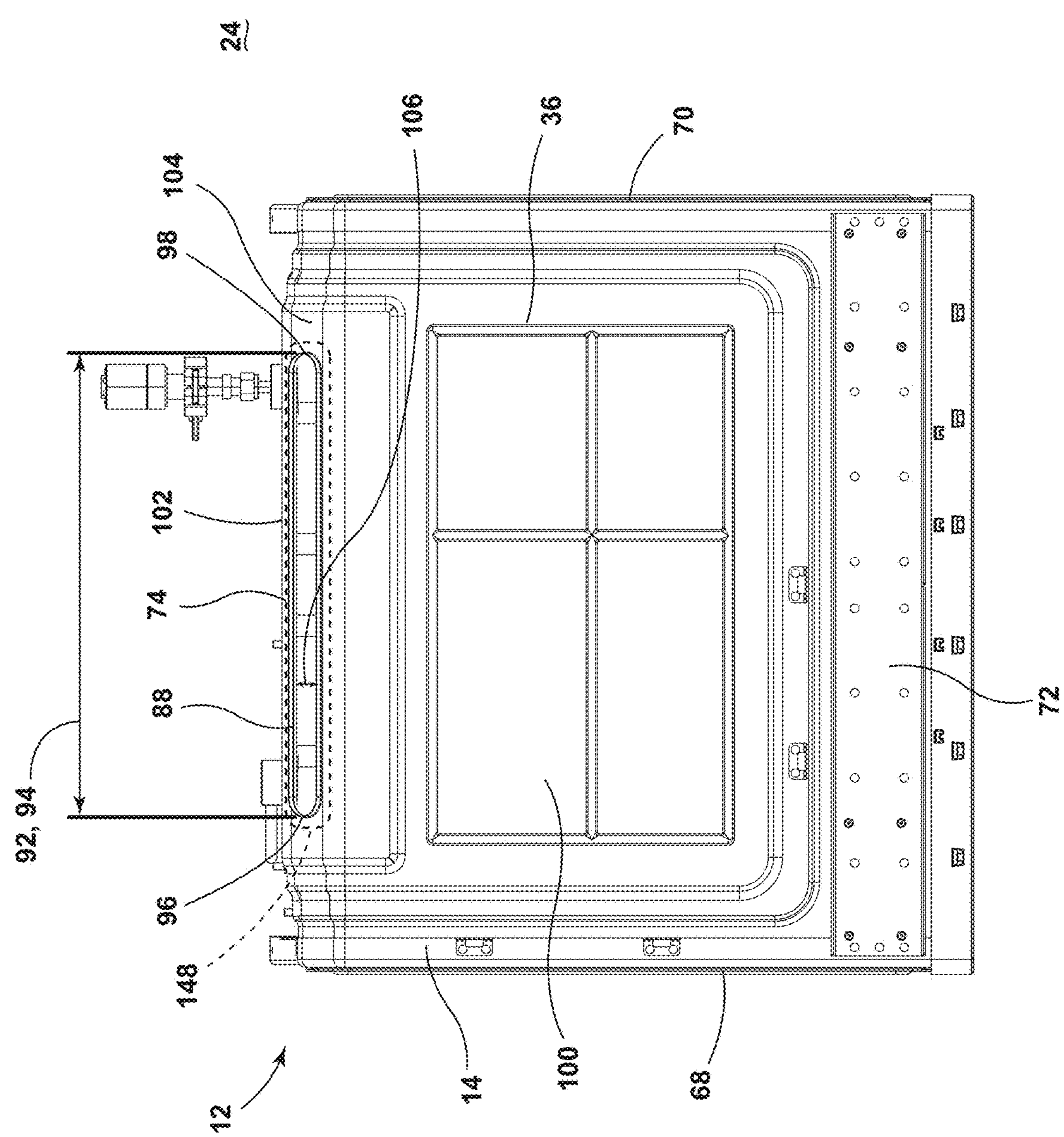
FIG. 7 is a top view of the walled structure of FIG. 1, illustrating the aperture through the outer wall portion into the interior volume having a dimension (e.g., a width) that is parallel to the dimensions of the outer wall portion and the reception compartment defined by the inner wall portion.
Figure 8:
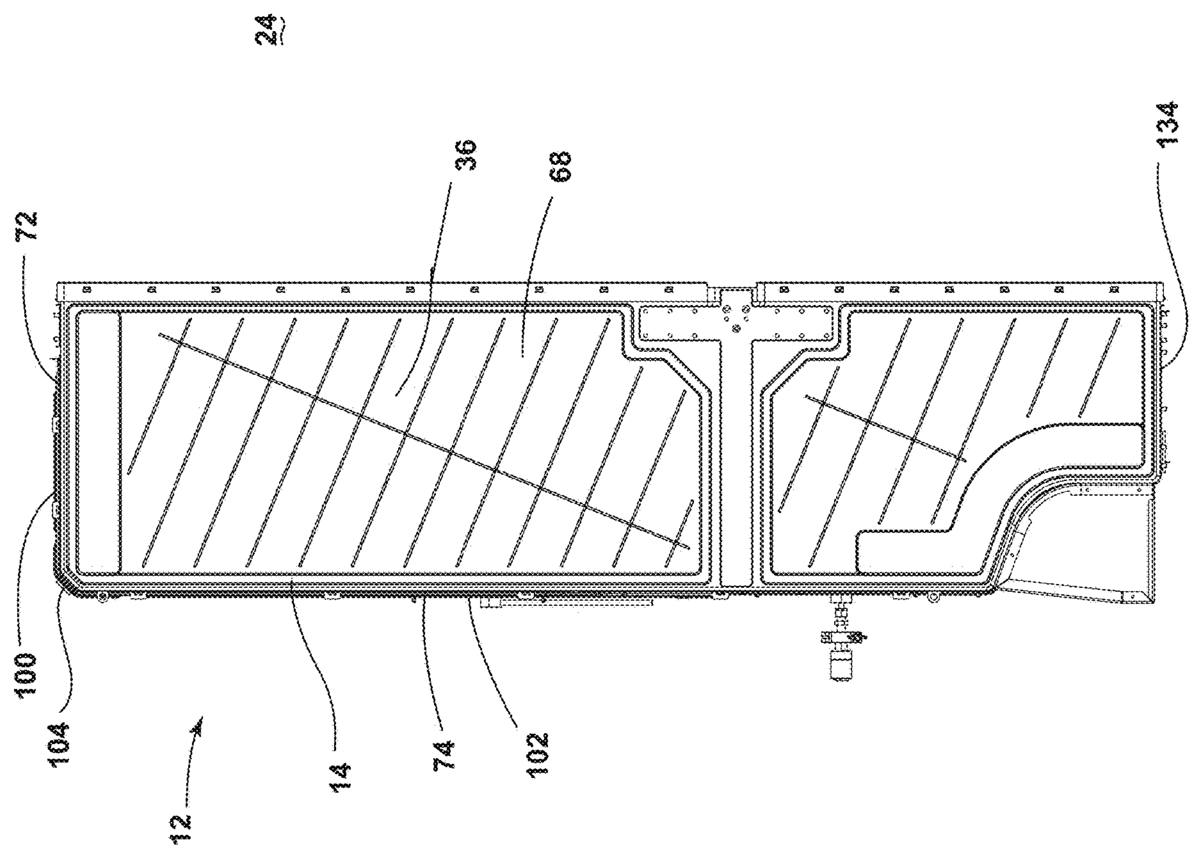
FIG. 8 is a side view of the walled structure of FIG. 1.
Figure 9:
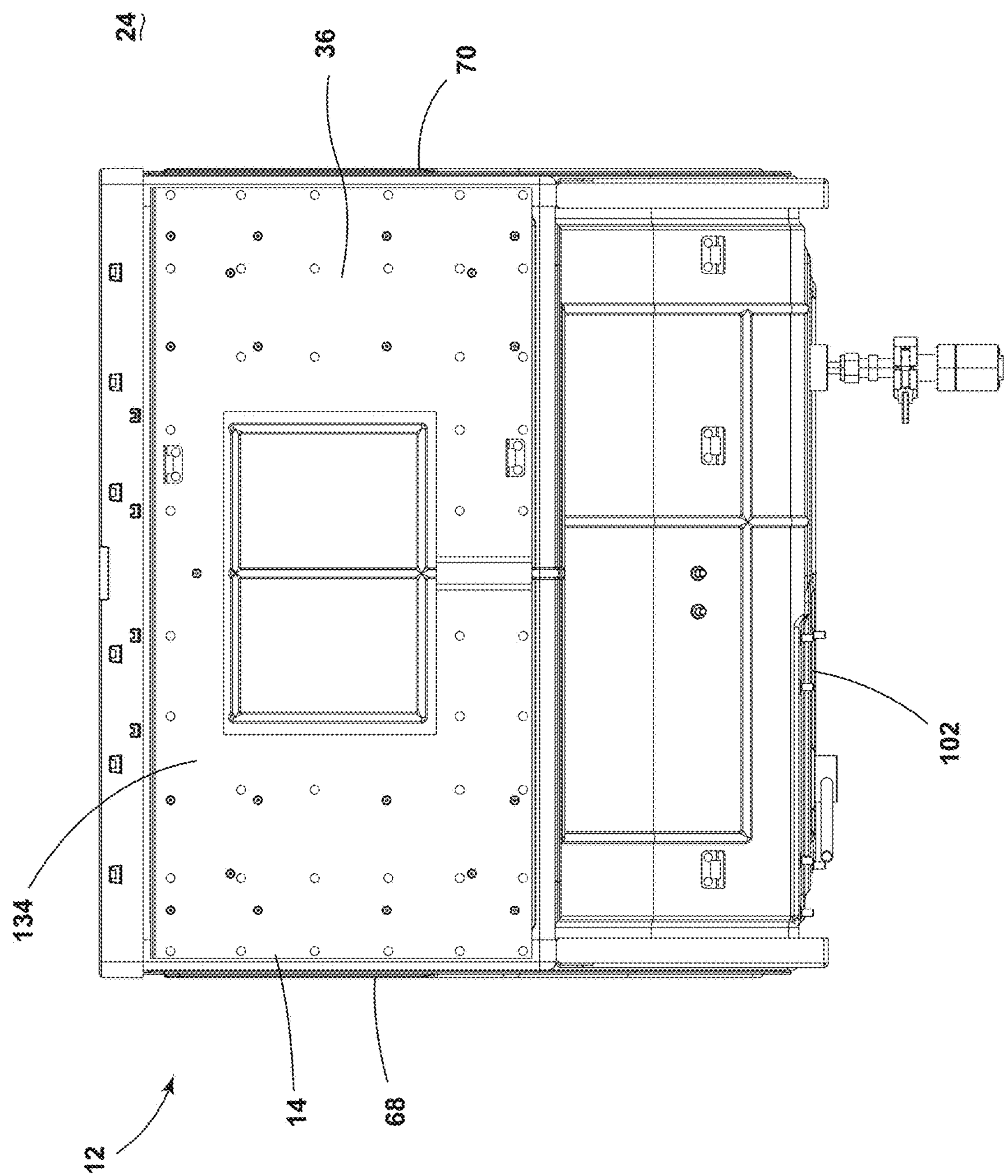
FIG. 9 is a bottom view of the walled structure of FIG. 1.
Figure 10:
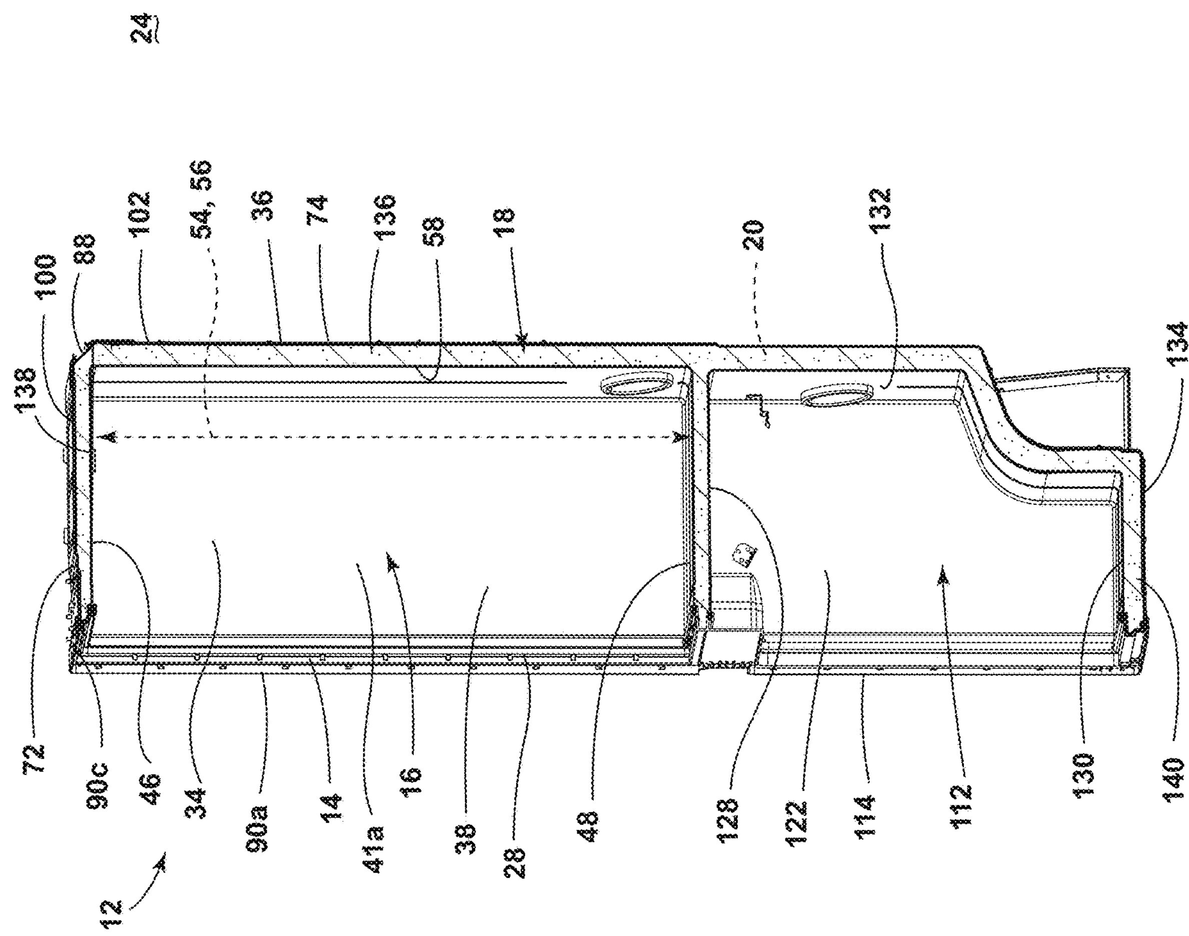
FIG. 10 is side view of a cross-section of the walled structure of FIG. 1 taken through line X-X of FIG. 4, illustrating the outer wall portion being spaced from the inner wall portion to define the interior volume, the interior volume having a rear portion that is generally vertical as well as a top portion, bottom portion, and a middle portion extending forward from the rear portion, and insulating material disposed within the interior volume.
Figure 11:
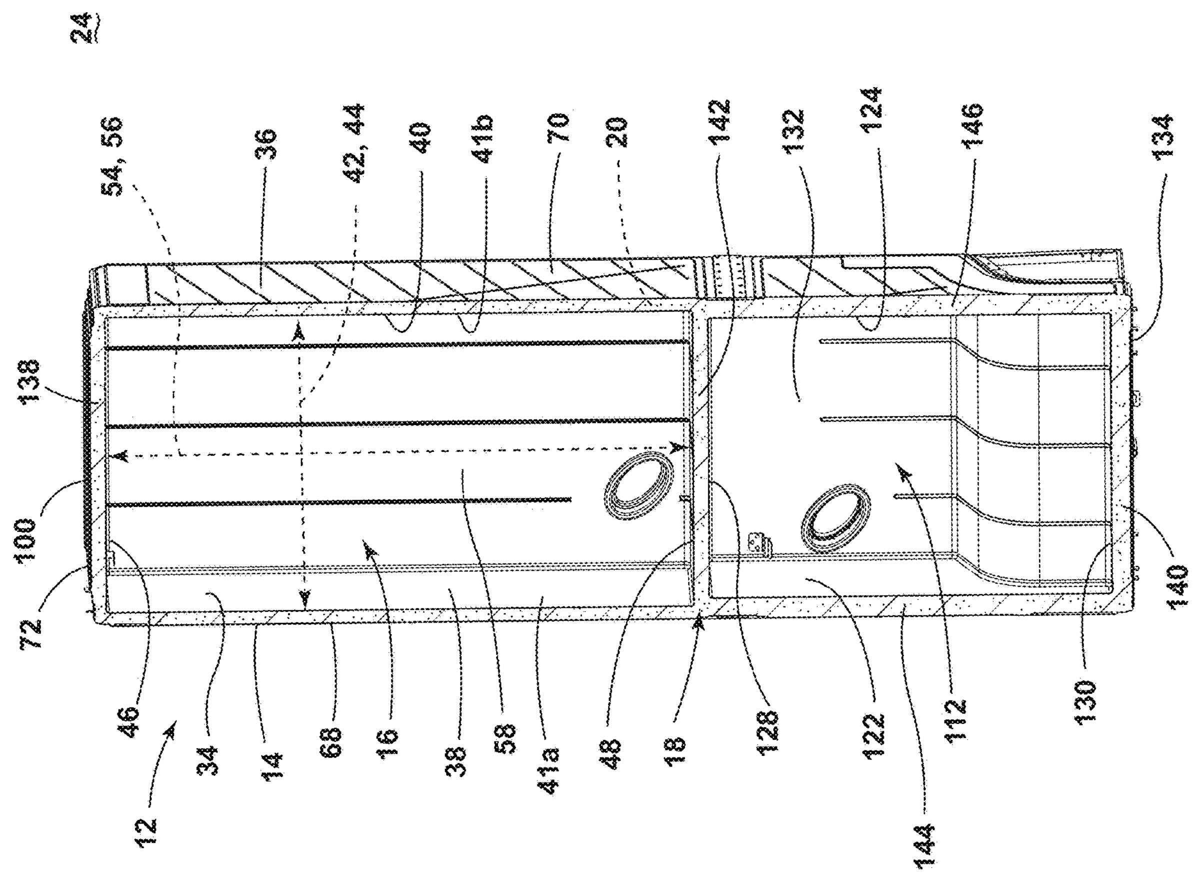
FIG. 11 is front perspective view of a cross-section of the walled structure of FIG. 1 taken through line XI-XI of FIG. 5, illustrating the interior volume additionally having a first side portion and a second side portion extending forward from the rear portion of the interior volume and generally vertically between the top portion and the bottom portion of the interior volume.
Figure 12:
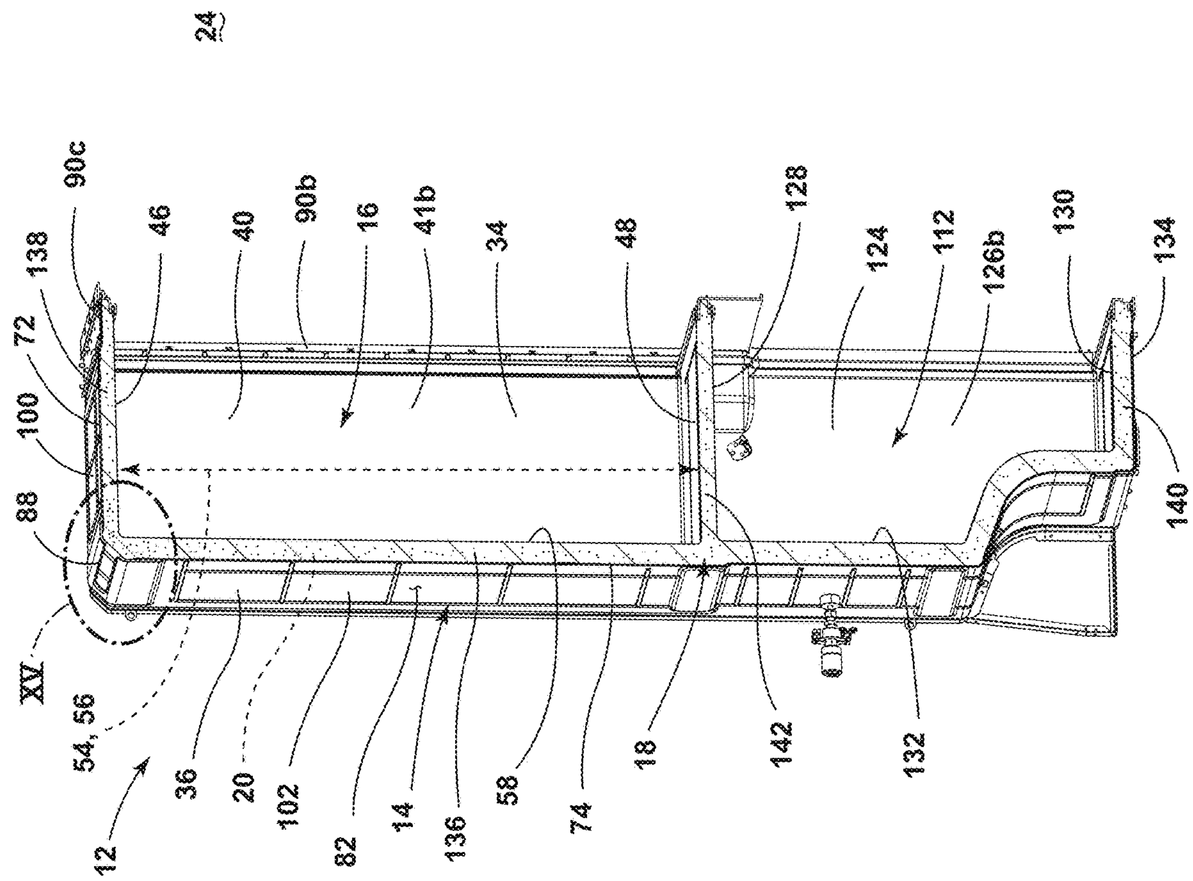
FIG. 12 is a side perspective view of a cross-section of the walled structure of FIG. 1 taken through XII-XII of FIG. 4, illustrating the aperture providing access through the outer wall portion of the walled structure into the interior volume.
Figure 13:
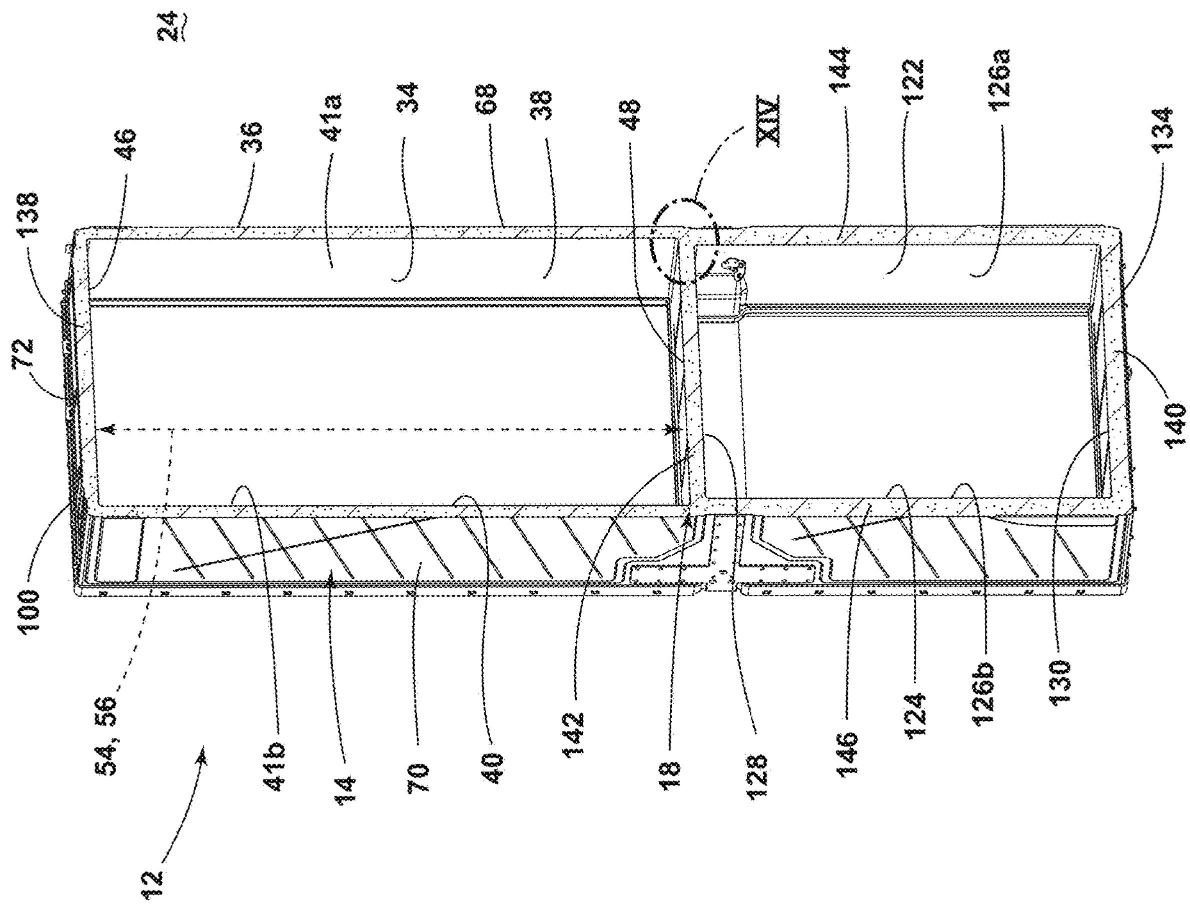
FIG. 13 is a rear perspective view of the cross-section of the walled structure of FIG. 1 taken through line XIII-XIII of FIG. 5, illustrating the top portion, the middle portion, and the bottom portion of the interior volume extending laterally between the first side portion and the second side portion of the interior volume.
Figure 14:
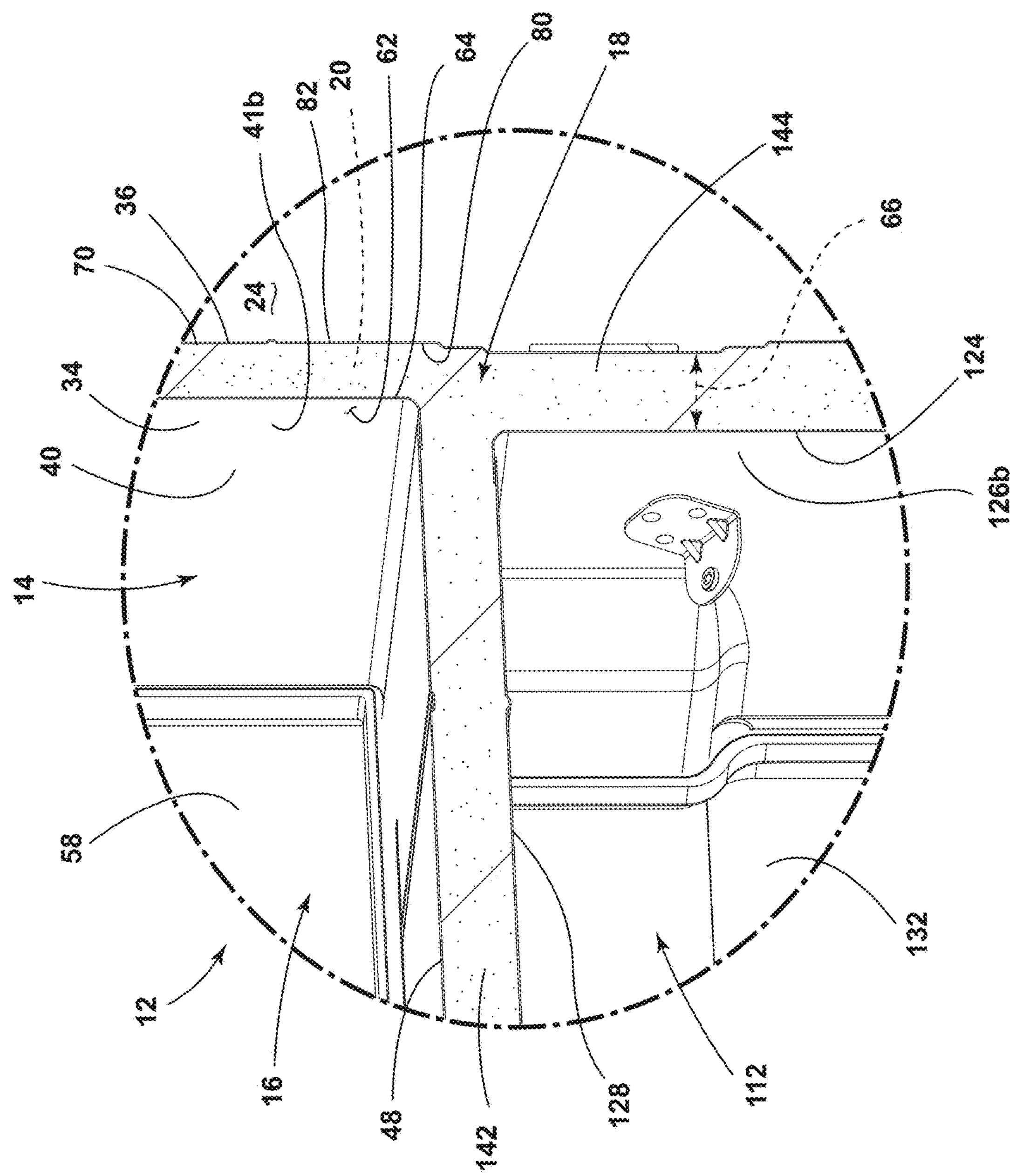
FIG. 14 is a closer up view of area XIV of FIG. 13, illustrating a space separating the outer wall portion of the walled structure from the inner wall portion.
Figure 15:
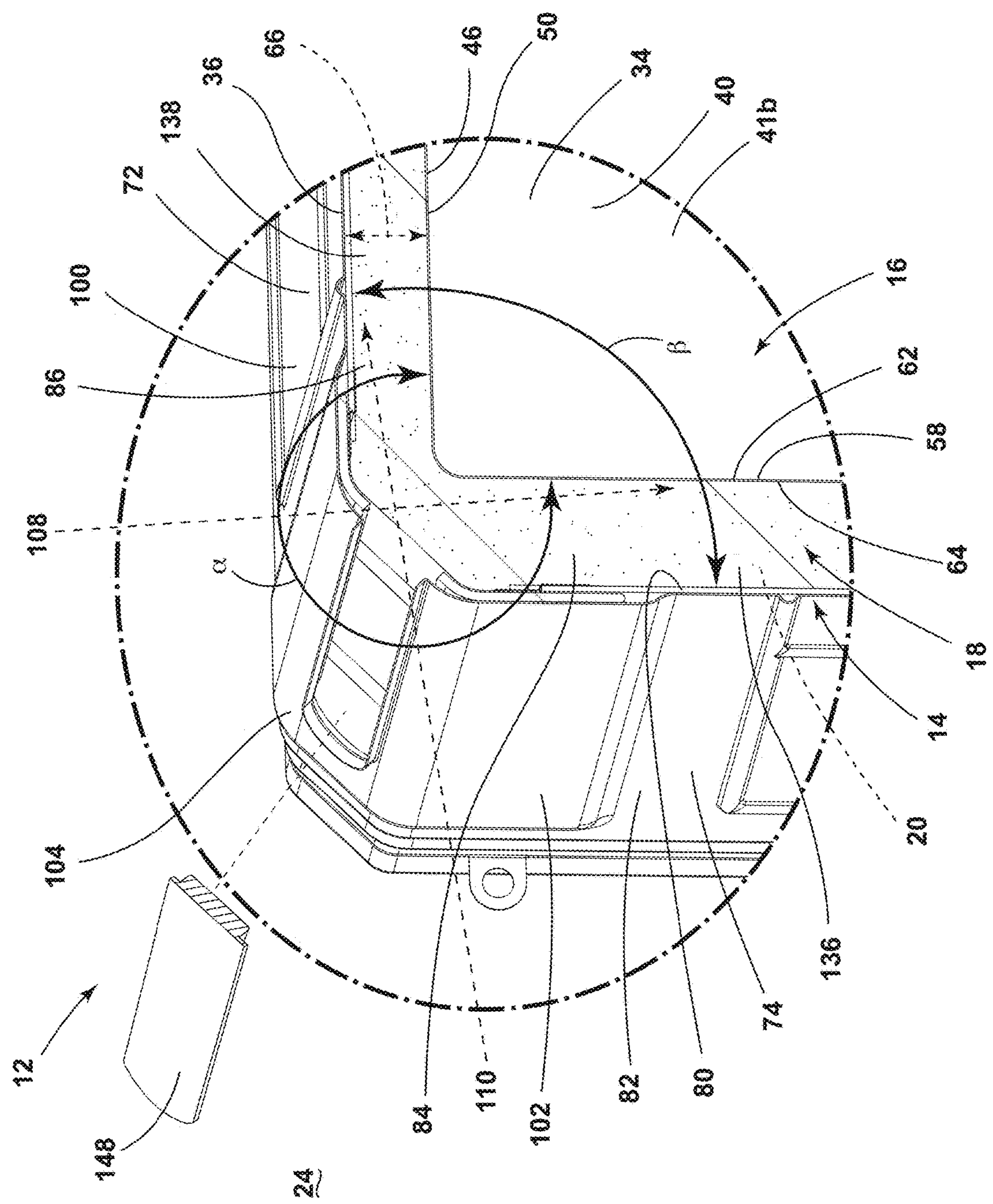
FIG. 15 is a closer up view of area XV of FIG. 12, illustrating the aperture providing a first straight line access into the rear portion of the interior volume and a second straight line access into the top portion of the interior volume.

Referring now to FIGS. 1 and 2, an appliance 10 is illustrated. The appliance 10 includes a liner 12 with a walled structure 14 shaped to define a reception compartment 16. The walled structure 14 is shaped to form an interior volume 18. The liner 12 further includes insulation material 20 disposed within the interior volume 18 of the walled structure 14. In embodiments, the appliance 10 includes a cabinet 22 partially surrounding the liner 12.

The liner 12 reduces heat transfer between matter in the reception compartment 16 and an external environment 24 surrounding the appliance 10. In embodiments, such as the illustrated embodiment, the appliance 10 is a refrigerator. In such embodiments, the reception compartment 16 can be a fresh food compartment or a freezer compartment to receive food and other perishable items. The liner 12 reduces heat transfer from the external environment 24 to such food and other perishable items. In other embodiments, the appliance 10 is a cooking device, such as an oven, and the reception compartment 16 again receives food. The liner 12 reduces heat transfer from the reception compartment 16 and the food to the external environment 24. In still other embodiments, the appliance 10 is a dishwasher, and the reception compartment 16 receives dishes for cleaning. The liner 12 reduces heat transfer from the heated water and dishes in the reception compartment 16 to the external environment 24. In still other embodiments, the appliance 10 is a clothes washing machine, and the reception compartment 16 receives clothes and other articles for cleaning. The liner 12 reduces heat transfer from the heated water, clothes, and other articles in the reception compartment 16 to the external environment 24. In still other embodiments, the appliance 10 is clothes dryer, and the reception compartment 16 receives wet clothes and other articles for drying. The liner 12 reduces heat transfer from the heated air, clothes, water, and other articles in the reception compartment 16 to the external environment 24. In all embodiments, the liner 12 may reduce noise transmitted from the reception compartment 16 to the external environment 24.

The appliance 10 further includes a door 26 cooperating with the walled structure 14 to selectively allow or deny access to the reception compartment 16. The walled structure 14, which will be discussed further below, leaves an opening 28 into the reception compartment 16. The door 26 has a closed position 30. In the closed position 30, the door 26 denies access to the reception compartment 16 through the opening 28. In other words, the door 26 in the closed position 30 covers the opening 28 into the reception compartment 16. In addition, the door 26 has an open position 32. In the open position 32, the door 26 allows access to the reception compartment 16 through the opening 28. The door 26 can be hingedly attached to the walled structure 14 of the liner 12, or the cabinet 22 surrounding the liner 12.

Referring now to FIGS. 3-15, the walled structure 14 includes, as will be illustrated, contiguous walls that surround and form the interior volume 18, within which the insulation material 20 is disposed. The walled structure 14 includes an inner wall portion 34 and an outer wall portion 36. The inner wall portion 34 is shaped to define the reception compartment 16. For example, as in the illustrated embodiment, the inner wall portion 34 includes a first section 38 and a second section 40 that opposes the first section 38. In embodiments, the first section 38 and the second section 40 are lateral walls 41*a*, 41*b* of the reception compartment 16. In embodiments, the first section 38 and the second section 40 of the inner wall portion 34 are generally planar but need not be. In any event, the first section 38 and the second section 40 of the inner wall portion 34 define a dimension 42 of the reception compartment 16—in the illustrated instance, a width 44 of the reception compartment 16. In other embodiments, the dimension 42 is a height or diameter of the reception compartment 16.

In embodiments, the inner wall portion 34 further includes a third section 46 and a fourth section 48 that opposes the third section 46. In embodiments, the third section 46 is the ceiling 50 of the reception compartment 16, while the fourth section 48 is the floor 52 of the reception compartment 16. In embodiments, as in the illustrated embodiment, the third section 46 and the fourth section 48 are generally planar but need not be. In embodiments, as in the illustrated embodiment, the third section 46 and the fourth section 48 are generally orthogonal to the first section 38 and the second section 40. The third section 46 and the fourth section 48 of the inner wall portion 34 define another dimension 54 of the reception compartment 16, in the illustrated instance, a height 56 of the reception compartment 16.

In embodiments, the inner wall portion 34 further includes a fifth section 58. In embodiments, the fifth section 58 is rearward of the opening 28 and is a rear wall 60 of the reception compartment 16. In embodiments, the fifth section 58 is generally planar, and is orthogonal to all of the first section 38, the second section 40, the third section 46, and the fourth section 48.

The inner wall portion 34 includes an inner surface 62 and an outer surface 64. The inner surface 62 forms the various walls 41*a*, 41*b*, 50, 52 of the reception compartment 16. The outer surface 64 faces away from the reception compartment 16. Rather, the outer surface 64 faces the interior volume 18 of the walled structure 14 and the insulation material 20 within the interior volume 18.

The outer wall portion 36 faces the inner wall portion 34 and at least partially surrounds the inner wall portion 34. A space 66 separates the outer wall portion 36 from the inner wall portion 34, thus forming the interior volume 18 and providing room for the insulation material 20 disposed within the interior volume 18. In other words, the interior volume 18 includes the space 66 between the inner wall portion 34 and the outer wall portion 36. The outer wall portion 36 is disposed further away from the reception compartment 16 than the inner wall portion 34. The outer wall portion 36 is disposed closer to the external environment 24 than the inner wall portion 34. For example, as in the illustrated embodiment, the outer wall portion 36 includes a first section 68 facing the first section 38 of the inner wall portion 34, a second section 70 facing the second section 40 of the inner wall portion 34, a third section 72 facing the third section 46 of the inner wall portion 34 and a fifth section 74 facing the fifth section 58 of the inner wall portion 34. In embodiments, the outer wall portion 36 includes a fourth section (not illustrated) facing the fourth section 48 of the inner wall portion 34, such as when the walled structure 14 forms only the reception compartment 16 and no additional reception compartments. The outer wall portion 36, for example the fifth section 74, has a dimension 76 (e.g., a width 78) parallel to the dimension 42 (e.g., width 44) of the reception compartment 16. The outer wall portion 36 includes an inner surface 80 that faces the interior volume 18 of the walled structure 14 and the outer surface 64 of the inner wall portion 34. The outer wall portion 36 further includes an outer surface 82 that faces the external environment 24.

In embodiments, the outer surface 64 of the inner wall portion 34 of the walled structure 14 facing the interior volume 18 forms a reflex angle $\alpha$. For example, in the illustrated embodiment, the outer surface 64 of the fifth section 58 of the inner wall portion 34 (i.e., the rear wall 60 of the reception compartment 16) is generally vertical and transitions contiguously to the third section 46 of the inner wall portion 34 (i.e., the ceiling 50 of the reception compartment 16) at a reflex angle $\alpha$ of approximately 270 degrees. The outer surface 64 of the inner wall portion 34 makes similar reflex angle $\alpha$ transitions from the second section 40 to the third section 46 of the inner wall portion 34, from the first section 38 to the third section 46 of the inner wall portion 34, from the second section 40 to the fifth section 58 of the inner wall portion 34, from the first section 38 to the fifth section 58 of the inner wall portion 34, from the second section 40 to the fourth section 48 of the inner wall portion 34, from the first section 38 to the fourth section 48 of the inner wall portion 34, and from the fourth section 48 to the fifth section 58 of the inner wall portion 34.

In embodiments, the inner surface 80 of the outer wall portion 36 of the walled structure 14 facing the interior volume 18 forms an approximately right angle $\beta$ (i.e., between 75 degrees and 105 degrees). For example, in the illustrated embodiment, the inner surface 80 of the fifth section 74 of the outer wall portion 36 (rearward of the rear wall 60 of the reception compartment 16) is generally vertical and transitions contiguously to the third section 72 of the outer wall portion 36 (above the ceiling 50 of the reception compartment 16). The approximately right angle β that the inner surface 80 of the outer wall portion 36 forms occurs just outward of the reflex a that the outer surface 64 of the inner wall portion 34 forms, separated by the interior volume 18. The inner surface 80 faces a first portion 84 of the interior volume 18 before forming the angle β and a second portion 86 of the interior volume 18 after forming the angle β. In embodiments, such as in the illustrated embodiment, the first portion 84 of the interior volume 18 is between the fifth section 74 of the outer wall portion 36 and the fifth section 58 of the inner wall portion 34—that is, behind the rear wall 60 of the reception compartment 16—and the second portion 86 of the interior volume 18 is between the third section 72 of the outer wall portion 36 and the third section 46 of the inner wall portion 34—that is, above the ceiling 50 of the reception compartment 16. The approximately right angle β transitions of the inner surface 80 of the outer wall portion 36 further occur between the second section 70 and the third section 72 of the outer wall portion 36, the first section 68 and the third section 72 of the outer wall portion 36, the second section 70 and the fifth section 74 of the outer wall portion 36, and the first section 68 and the fifth section 74 of the outer wall portion 36.

The walled structure 14 further includes an aperture 88 through the walled structure 14 that provides access to the interior volume 18. Aside from the aperture 88, in embodiments, the walled structure 14 forms an air-tight seal around the interior volume 18. Transition areas 90*a*-90*c* in the walled structure 14 transition between the outer wall portion 36 and the inner wall portion 34. For example, a first transition area 90*a* transitions the first section 68 of the outer wall portion 36 to the first section 38 of the inner wall portion 34, a second transition area 90*b* transitions the second section 70 of the outer wall portion 36 to the second section 40 of the inner wall portion 34, and a third transition area 90*c* transitions the third section 72 of the outer wall portion 36 to the third section 46 of the inner wall portion 34. In embodiments, the walled structure 14 comprises sheet metal, which can be stamped, bent to the desired shape, and welded to form an air-tight structure. In embodiments, the walled structure 14 comprises a polymer material.

The aperture 88 has a dimension 92 parallel to the dimension 42 of the reception compartment 16 and the dimension 42 of the outer wall portion 36. For example, in embodiments, the aperture 88 is an oblong oval, circle, rectangle, or square and the dimension 92 is the width 94 of the aperture 88. The width 94 can extend laterally, for example, from a place 96 to a place 98. The place 96 is closer to the first section 68 of the outer wall portion 36 than the place 98, and the place 98 is closer to the second section 70 of the outer wall portion 36 than the place 96. The aperture 88 can be disposed at the third section 72 of the outer wall portion 36 (e.g., at a top 100 of the walled structure 14, at the fifth section 74 of the outer wall portion 36 (e.g., at a rear 102 of the walled structure 14), or at an angled transition 104 between the third section 72 and the fifth section 74. In embodiments, the dimension 92 (e.g., the width 94) of the aperture 88 is at least 25 percent of the dimension 76 (e.g., the width 78) of the outer wall portion 36 of the walled structure 14. In other embodiments, the dimension 92 (e.g., the width 94) of the aperture 88 is at least 30 percent, 35 percent, 40 percent, 45 percent, 50 percent, 55 percent, or 60 percent of the dimension 76 (e.g., the width 78) of the outer wall portion 36 of the walled structure 14. As will be further discussed below, the dimension 92 of the aperture 88 being at least 25 percent of the dimension 42 of the outer wall facilitates depositing the insulation material 20 into the walled structure 14. The aperture further includes a dimension 106 that is orthogonal to the dimension 92. In embodiments, the dimension 106 is less than 35 percent of the dimension 92 of the aperture 88, such as greater than 10 percent and less than 35 percent of the dimension 92.

The positioning of the aperture 88 can also facilitate depositing the insulation material 20 into the walled structure 14. For example, positioning of the aperture 88 through the outer wall portion 36 at the angled transition 104 where the inner surface 80 of the outer wall portion 36 forms the angle β provides (i) a first straight line access 108 from the external environment 24 to the first portion 84 of the interior volume 18 and (ii) a second straight line access 110 from the external environment 24 to the second portion 86 of the interior volume 18. As will be further explained below, the first straight line access 108 and the second straight line access 110 allow the insulation material 20 to be directed to different portions of the interior volume 18 more easily than if the aperture 88 were positioned differently.

In embodiments, the inner wall portion 34 of the walled structure 14 is further shaped to define a second reception compartment 112. In embodiments, such as in the illustrated embodiment, the second reception compartment 112 is disposed below the first reception compartment 16. However, in other embodiments, the second reception compartment 112 is disposed above or beside the first reception compartment 16. In embodiments where the appliance 10 is a refrigerator, the reception compartment 16 can be configured as a fresh food compartment, where the contents are maintained at a temperature slightly above the freezing temperature of water (e.g., 35° F. to 40° F.), and the second reception compartment 112 can be configured as a frozen food compartment, where the contents are maintained at a temperature below the freezing temperature of water (e.g., 10° F. to 20° F.). The reception compartment 16 can be the frozen food compartment and the second reception compartment 112 can be the fresh food compartment, alternatively.

The walled structure 14 provides a second opening 114 into the second reception compartment 112. The door 26 of the appliance 10 can be sized to selectively allow or deny access to the second reception compartment 112 simultaneously with the reception compartment 16. Alternatively, in embodiments, the appliance 10 further includes a second door 116 sized and positioned so that the second door 116 denies access to the second reception compartment 112 through the second opening 114 when the second door 116 is in a closed position 118 but allows access when the door is in an open position 120.

In embodiments, such as the illustrated embodiment, the inner wall portion 34 of the walled structure 14 further includes a sixth section 122 and a seventh section 124 that opposes the sixth section 122. In embodiments, the sixth section 122 and the seventh section 124 are lateral walls 126*a*, 126*b* of the second reception compartment 112. In embodiments, the sixth section 122 and the seventh section 124 are generally planar but need not be.

In embodiments, the inner wall portion 34 further includes an eighth section 128 and a ninth section 130 that opposes the eighth section 128. In embodiments, the eighth section 128 is the ceiling of the second reception compartment 112, while the ninth section 130 is the floor of the second reception compartment 112. In embodiments, the eighth section 128 is generally planar but need not be.

In embodiments, the inner wall portion 34 further includes a tenth section 132. In embodiments, the tenth section 132 is rearward of the second opening 114 and is a rear wall of the second reception compartment 112. In embodiments, the tenth section 132 is generally planar and is orthogonal to all of the sixth section 122, the seventh section 124, the eighth section 128, and the ninth section 130.

In embodiments, the first section 68 of the outer wall portion 36, in addition to facing the first section 38 of the inner wall portion 34, extends to additionally face the sixth section 122 of the inner wall portion 34. Likewise, the second section 70 of the outer wall portion 36, in addition to facing the second section 40 of the inner wall portion 34, extends to additionally face the seventh section 124 of the inner wall portion 34. In embodiments, the outer wall portion 36 further includes an eighth section (not illustrated) to additionally face the eighth section 128 of the inner wall portion 34. In embodiments, the outer wall portion 36 further includes a ninth section 134 to additionally face the ninth section 130 of the inner wall portion 34. In embodiments, such as that illustrated, the eighth section 128 of the inner wall portion 34 faces the fourth section 48 of the inner wall portion 34.

As mentioned, the interior volume 18 is disposed between the inner wall portion 34 and the outer wall portion 36, as well as between the fourth section 48 and the eighth section 128 of the inner wall portion 34 formed to separate the reception compartment 16 from the second reception compartment 112. In embodiments, the interior volume 18 includes a rear portion 136 that is rearward of the reception compartment 16 and, if included, the second reception compartment 112. In embodiments, the rear portion 136 of the interior volume 18 is coincident with the first portion 84 of the interior volume 18 mentioned above. In embodiments, the rear portion 136 extends generally vertically and laterally within the appliance 10.

In embodiments, the interior volume 18 further includes a top portion 138 that extends above the reception compartment 16. In embodiments, the top portion 138 of the interior volume 18 is coincident with the second portion 86 mentioned above. In embodiments, the interior volume 18 further includes a bottom portion 140 that extends below the second reception compartment 112. In embodiments, the interior volume 18 further includes a middle portion 142 that extends between the reception compartment 16 and the second reception compartment 112. In embodiments, the top portion 138, the bottom portion 140, and the middle portion 142 of the interior volume 18 all extend generally horizontally and laterally relative to the appliance 10, and forward from the rear portion 136 of the interior volume 18. The interior volume 18 is contiguous throughout the rear portion 136, the top portion 138, the bottom portion 140, and the middle portion 142. In embodiments, the aperture 88 is disposed adjacent to the rear portion 136 and the top portion 138 of the interior volume 18 at the angled transition 104.

In embodiments, the interior volume 18 further includes a first side portion 144 that is lateral to the reception compartment 16 and, if included, the second reception compartment 112. In embodiments, the interior volume 18 further includes a second side portion 146 that is lateral the reception compartment 16 and, if included, the second reception compartment 112. The second side portion 146 opposes the first side portion 144. In embodiments, the first side portion 144 and the second side portion 146 extend generally vertically and forward from the rear portion 136 of the interior volume 18.

The liner 12 further includes a seal 148. After the insulation material 20 has been deposited into the interior volume 18, the seal 148 seals the aperture 88 of the walled structure 14 in an air-tight manner. In embodiments, air is removed from the interior volume 18 before the seal 148 seals the aperture 88. The result is that the interior volume 18 of the walled structure 14 has an air pressure that is less than an air pressure of the external environment 24 surrounding the liner 12. Stated another way, the air pressure of the external environment 24 surrounding the liner 12 is greater than the air pressure of the interior volume 18 of the walled structure 14.

Figure 16:
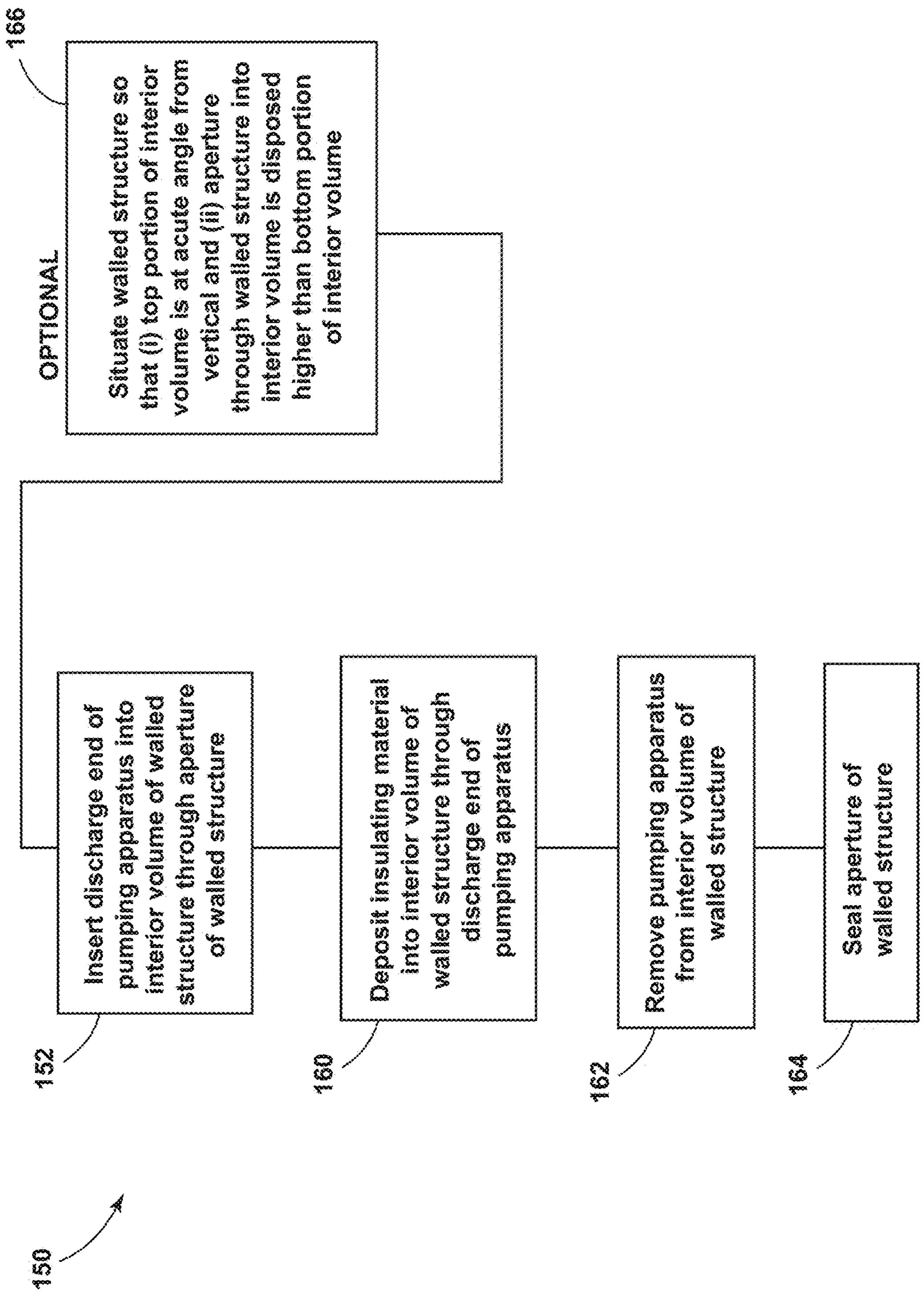
FIG. 16 is a flow diagram of a method of manufacturing a liner for an appliance, illustrating a step of inserting a discharge end of a pumping apparatus through the aperture of the walled structure to discharge the insulation material into the interior volume of the walled structure.
Figure 17:
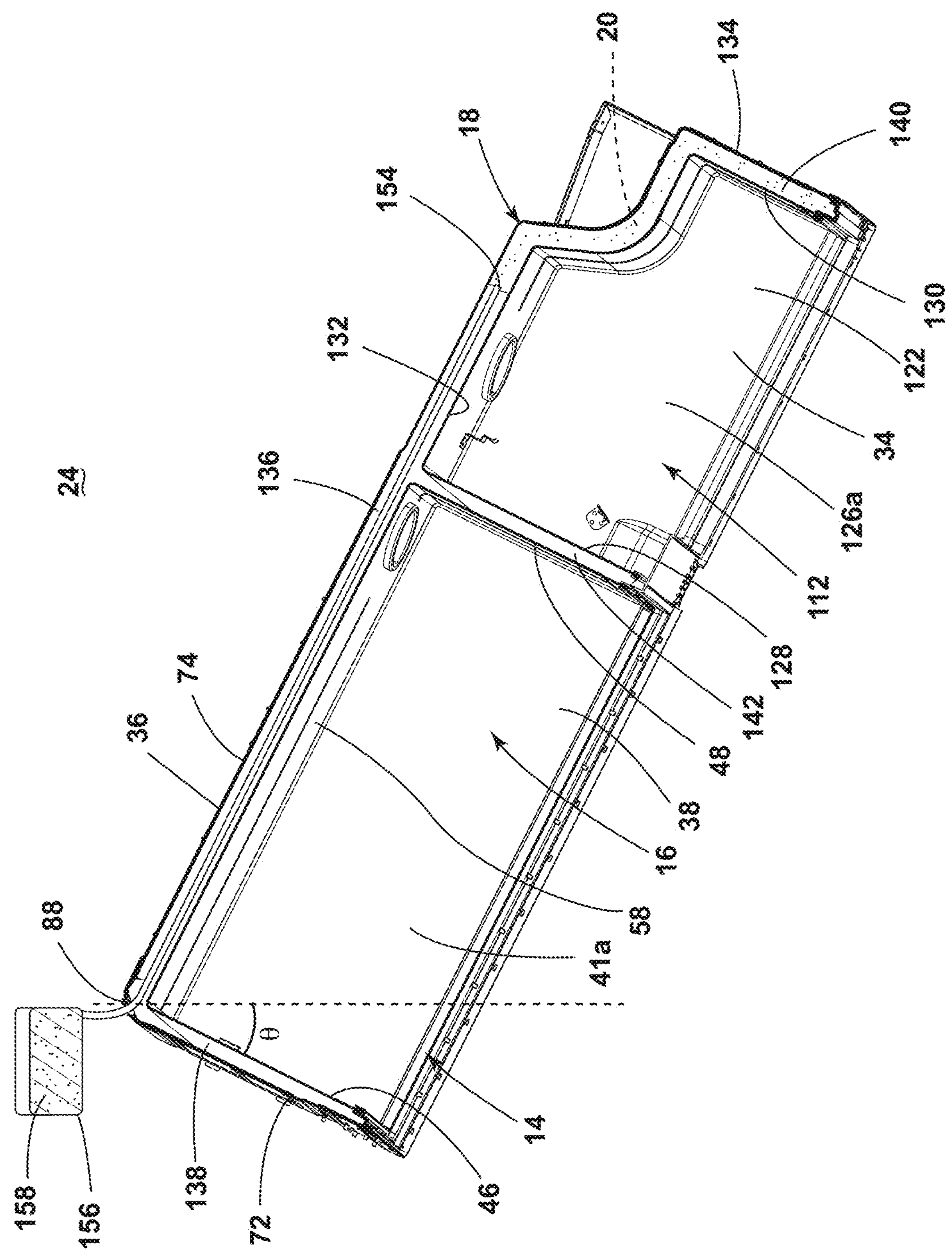
FIG. 17 is an elevation view of the cross-section of the walled structure of FIG. 1 taken through the line X-X of FIG. 4, illustrating the walled structure being oriented so that the aperture into the interior volume is higher than the interior volume and all of the rear portion, the top portion, the bottom portion, and the middle portion of the interior volume form an acute angle relative to vertical to allow the force of gravity to assist in migrating the insulation material to the terminal end of the interior volume, and additionally illustrating a discharge end of a pumping apparatus being inserted through the aperture to discharge the insulation material throughout the interior volume.

Referring now to FIGS. 16 and 17, a method 150 of manufacturing the liner 12 for the appliance 10 is herein disclosed. At a step 152, the method 150 includes inserting a discharge end 154 of a pumping apparatus 156 into the interior volume 18 of the walled structure 14 through the aperture 88 of the walled structure 14. The pumping apparatus 156 is configured to transfer the insulation material 20 from a source 158 of the insulation material 20 and out the discharge end 154 of the pumping apparatus 156. The insulation material 20 can be an insulating powder, insulating foam, granular insulation, microspheres, nanospheres, silica-based material, various ash-based material, combinations thereof and other similar insulating components.

At a step 160, the method 150 further includes depositing the insulation material 20 into the interior volume 18 of the walled structure 14 through the discharge end 154 of the pumping apparatus 156. The discharge end 154 can be placed through the rear portion 136 of the interior volume 18 toward the bottom portion 140 of the interior volume 18. The pumping apparatus 156 can discharge the insulation material 20 into the bottom portion 140 of the interior volume 18 and part of the rear portion 136 of the interior volume 18 disposed between the middle portion 142 and the bottom portion 140 of the interior volume 18. The discharge end 154 can then be moved to above the middle portion 142 of the interior volume 18. The pumping apparatus 156 can discharge the insulation material 20 into the middle portion 142 of the interior volume 18 and the remainder of the rear portion 136 disposed between the middle portion 142 and the bottom portion 140 of the interior volume 18. The discharge end 154 can then be moved to near the top portion 138 of the interior volume 18. The pumping apparatus 156 can discharge the insulation material 20 into the rear portion 136 of the interior volume 18 disposed between the top portion 138 and the middle portion 142 of the interior volume 18, and the top portion 138 of the interior volume 18. The aperture 88 being positioned to provide the first straight line access 108 and the second straight line access 110 allows the discharge end 154 to be placed both into the rear portion 136 of the interior volume 18 and the top portion 138 of the interior volume 18, respectively, so that insulation material 20 can be discharged into both portions adequately.

During the step 160, the discharge end 154 can be moved above the first side portion 144 and the second side portion 146 of the interior volume 18, and the pumping apparatus 156 can discharge the insulation material 20 into the first side portion 144 and the second side portion 146. The aperture 88 through the walled structure 14 into the interior volume 18 having the dimension 92 (in the illustrated embodiment, the width 94) that is at least 25 percent of the dimension 76 (also here the width 78) of the outer wall portion 36 of the walled structure 14 provides space for the discharge end 154 of the pumping apparatus 156 to be placed sufficiently close to the first side portion 144 and the second side portion 146 of the interior volume 18. Less than 25 percent would likely prevent the discharge end 154 from being sufficiently close to the first side portion 144 and the second side portion 146 to adequately fill those portions with the insulation material 20, especially closer to the aperture 88. The higher the percentage (e.g., 30 percent, 40 percent, etc.), the closer the discharge end 154 of the pumping apparatus 156 can be placed to the first side portion 144 and the second side portion 146, and more readily the insulation material 20 can be discharged there. In addition, the longer the dimension 92, the more the discharge end 154 of the pumping apparatus 156 can be moved around along that dimension 92, which decreases the likelihood that the insulation material 20 will clog any particular area of the interior volume 18. Movement of the discharge end 154 can unclog clogged areas, as well.

At a step 162, the method 150 further includes removing the pumping apparatus 156 from the interior volume 18 of the walled structure 14. After the interior volume 18 is sufficiently filled with the insulation material 20, the discharge end 154 is removed from the interior volume 18 and placed in the external environment 24. At a step 164, the method 150 further includes sealing the aperture 88 of the walled structure 14, such as with the seal 148.

In embodiments, at a step 166, the method 150 further includes, situating the walled structure 14 so that (i) the top portion 138 of the interior volume 18 is at an acute angle θ from vertical and (ii) the aperture 88 through the walled structure 14 into the interior volume 18 is disposed higher than the bottom portion 140 of the interior volume 18. In embodiments, the aperture 88 through the walled structure 14 into the interior volume 18 is disposed higher than the middle portion 142 of the interior volume 18. So situating the walled structure 14 allows the force of gravity to pull the insulation material 20 downward so that the insulation material 20 fills the extreme ends of the top portion 138, the middle portion 142, and the bottom portion 140 of the interior volume 18 first before the remainder of those portions are filled. In embodiments, the walled structure 14 is vibrated during the step of depositing the insulation material 20. Vibrations help the insulation material 20 settle downward, which increases the percentage of the interior volume 18 that is filled with the insulation material 20. Utilizing the method 150 allows approximately 100 percent of the interior volume 18 to be filled with the insulation material 20.

It will be understood by one having ordinary skill in the art that construction of the described disclosure and other components is not limited to any specific material. Other exemplary embodiments of the disclosure disclosed herein may be formed from a wide variety of materials, unless described otherwise herein.

What is claimed is:

1. A method of manufacturing a liner for an appliance comprising:

inserting a discharge end of a pumping apparatus into an interior volume of a walled structure through an aperture through an outer wall portion of the walled structure;

depositing insulating material into the interior volume of the walled structure through the discharge end of the pumping apparatus;

removing the pumping apparatus from the interior volume of the walled structure; and sealing the aperture of the walled structure, wherein, the interior volume comprises (i) a rear portion that extends generally along a rear of the appliance and (ii) a top portion that extends generally along a top of the appliance; and wherein, the aperture is disposed through the outer wall portion adjacent to where the top portion and the rear portion of the interior volume join.

2. The method of claim 1, wherein the walled structure further comprises:

an inner wall portion that is shaped to define a reception compartment, the inner wall portion comprising a first section and a second section opposing the first section, the first section and the second section defining a dimension of the reception compartment;

the outer wall portion of the walled structure faces the inner wall portion and at least partially surrounds the inner wall portion, the outer wall portion separated from the inner wall portion by a space, the outer wall portion being disposed further away from the reception compartment than the inner wall portion, the outer wall portion having a dimension parallel to the dimension of the reception compartment;

the interior volume further comprises the space between the inner wall portion and the outer wall portion; and the aperture through the outer wall portion comprises a dimension parallel to the dimension of the reception compartment and the dimension of the outer wall portion, the dimension of the aperture being at least 25 percent of the dimension of the outer wall portion.

3. The method of claim 2, wherein the inner wall portion is further shaped to define a second reception compartment disposed below the reception compartment, and the walled structure provides a second opening into the second reception compartment;

the rear portion of the interior volume is disposed rearward of both the reception compartment and the second reception compartment, the top portion of the interior volume extends above the reception compartment, the interior volume further comprises a bottom portion that extends below the second reception compartment;

the interior volume is contiguous throughout the rear portion, the top portion, and the bottom portion;

the aperture through the outer wall portion provides (i) a first straight-line access from an external environment to the top portion of the interior volume and (ii) a second straight-line access from the external environment to the rear portion of the interior volume; and the method further comprises:

before removing the pumping apparatus from the interior volume, situating the walled structure so that (i) the top portion of the interior volume is at an acute angle θ from vertical and (ii) the aperture through the outer wall portion into the interior volume is disposed higher than the bottom portion of the interior volume.

4. The method of claim 1, wherein the aperture through the outer wall portion comprises a dimension that is at least 25 percent of a parallel dimension of the outer wall portion.

5. The method of claim 1, wherein the aperture comprises a dimension that is at least 50 percent of a parallel dimension of the outer wall portion.

6. The method of claim 5, wherein the dimension of the aperture is a width of the aperture and the parallel dimension of the outer wall portion is a width of the outer wall portion.

7. The method of claim 1 further comprising:

while depositing insulating material into the interior volume of the walled structure through the discharge end of the pumping apparatus, moving the discharge end from side to side of the interior volume, wherein, a dimension of the aperture allows the discharge end to be moved from side to side.

8. The method of claim 1, wherein the aperture is disposed adjacent a junction of a change in geometry of the interior volume.

9. The method of claim 1 further comprising:

placing the discharge end of the pumping apparatus into the rear portion of the interior volume via the aperture; and placing the discharge end of the pumping apparatus into the top portion of the interior volume via the same aperture.

10. The method of claim 1, wherein the walled structure is shaped to define more than one compartment.

11. The method of claim 1 further comprising:

before inserting the discharge end of the pumping apparatus, orienting the walled structure so that the aperture is higher than the rear portion and the top portion of the interior volume.

12. The method of claim 1, wherein except for the aperture, the walled structure forms an air-tight seal around the interior volume.

13. A method of manufacturing a liner for an appliance comprising:

inserting a discharge end of a pumping apparatus into an interior volume of a walled structure through an aperture of the walled structure;

depositing insulating material into the interior volume of the walled structure through the discharge end of the pumping apparatus;

removing the pumping apparatus from the interior volume of the walled structure; and sealing the aperture of the walled structure, wherein, the walled structure is shaped to define a reception compartment of the appliance and an opening into the reception compartment, the walled structure comprising (i) a rear wall of the reception compartment that is rearward of the opening and (ii) a ceiling of the reception compartment;

wherein, the interior volume comprises (i) a rear portion that is disposed behind the rear wall and (i) a top portion that is above the ceiling; and wherein, the aperture is positioned to provide (i) a first straight-line access from an external environment to the rear portion of the interior volume and (ii) a second straight-line access from the external environment to the top portion of the interior volume.

14. The method of claim 13, wherein the rear portion of the interior volume extends generally vertically and laterally, and the top portion of the interior volume extends generally horizontally and laterally.

15. The method of claim 13, wherein the interior volume further comprises (i) a first side portion that is lateral to the reception compartment and (ii) a second side portion that is lateral to the reception compartment and opposes the first side portion; and the first side portion and the second side portion extend generally vertically and forward from the rear portion of the interior volume.

16. The method of claim 14, wherein depositing insulating material into the interior volume of the walled structure through the discharge end of the pumping apparatus comprises (i) placing the discharge end to the first side portion and depositing insulating material into the first side portion and (ii) placing the discharge end to the second side portion and depositing insulating material into the second side portion.

17. The method of claim 1 further comprising:

before sealing the aperture of the walled structure, removing air from the interior volume;

wherein, after sealing the aperture of the walled structure, the interior volume of the walled structure has an air pressure that is less than an air pressure of an external environment surrounding the liner.

18. A method of manufacturing a liner for an appliance comprising:

with a walled structure comprising: (a) an inner wall portion that is shaped to define a ceiling and a floor of a reception compartment, (b) an outer wall portion facing the inner wall portion and at least partially surrounding the inner wall portion, the outer wall portion being disposed further away from the reception compartment than the inner wall portion and separated from the inner wall portion by a space defining an interior volume of the walled structure, the interior volume comprising (i) a top portion disposed above the ceiling of the reception compartment and (ii) a bottom portion disposed below the floor of the reception compartment, and (c) an aperture through the outer wall portion into the interior volume:

situating the walled structure so that (i) the top portion of the interior volume forms an acute angle $\theta$ from vertical and (ii) the aperture through the walled structure into the interior volume is disposed higher than the bottom portion of the interior volume;

inserting a discharge end of a pumping apparatus into the interior volume through the aperture through the outer wall portion of the walled structure;

depositing insulating material into the interior volume of the walled structure through the discharge end of the pumping apparatus;

removing the pumping apparatus from the interior volume of the walled structure; and sealing the aperture of the walled structure.

19. The method of claim 1 further comprising:

vibrating the walled structure while depositing insulating material into the interior volume.

20. The method of claim 1, wherein the insulation material is one or more of insulating powder, granular insulation, microspheres, nanospheres, silica-based material, and ash-based material.

* * * * *